(12) United States Patent
Endo et al.

(10) Patent No.: US 10,576,966 B2
(45) Date of Patent: Mar. 3, 2020

(54) CONTROL SYSTEM FOR HYBRID VEHICLE

(71) Applicant: TOYOTA JIDOSHA KABUSHIKI KAISHA, Toyota-shi, Aichi-ken (JP)

(72) Inventors: Takahito Endo, Shizuoka-ken (JP); Yasuhiro Oshiumi, Gotemba (JP); Kensei Hata, Shizuoka-ken (JP); Yasuyuki Kato, Numazu (JP); Yushi Seki, Susono (JP); Katsuya Iwazaki, Susono (JP); Akira Murakami, Gotemba (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 136 days.

(21) Appl. No.: 15/684,380

(22) Filed: Aug. 23, 2017

(65) Prior Publication Data

US 2018/0056982 A1    Mar. 1, 2018

(30) Foreign Application Priority Data

Aug. 25, 2016    (JP) .................................. 2016-164484

(51) Int. Cl.
*B60W 20/40* (2016.01)
*B60W 10/06* (2006.01)
(Continued)

(52) U.S. Cl.
CPC ............. *B60W 20/40* (2013.01); *B60N 2/002* (2013.01); *B60W 10/06* (2013.01); *B60W 10/08* (2013.01); *B60W 10/18* (2013.01); *B60W 10/20* (2013.01); *B60W 20/10* (2013.01); *B60W 20/13* (2016.01); *B60W 20/17* (2016.01); *B60W 20/20* (2013.01); *G05D 1/0061* (2013.01); *G05D 1/0088* (2013.01); *G05D 1/0248* (2013.01); *G05D 1/0251* (2013.01); *G05D 1/0255* (2013.01); *G05D 1/0257* (2013.01); *G05D 1/0274* (2013.01); *G05D 1/0278* (2013.01); *B60W 2400/00* (2013.01); *B60W 2420/42* (2013.01); *B60W 2420/52* (2013.01); *B60W 2420/54* (2013.01); *B60W 2510/0604* (2013.01); *B60W 2510/0638* (2013.01); *B60W 2510/081* (2013.01); *B60W 2510/083* (2013.01);
(Continued)

(58) Field of Classification Search
CPC ...... B60W 20/40; B60W 10/08; B60W 10/18; B60W 10/20
USPC ........................................................... 701/22
See application file for complete search history.

(56) References Cited

U.S. PATENT DOCUMENTS

2005/0092542 A1    5/2005  Turner

FOREIGN PATENT DOCUMENTS

| JP | H09088656 A | 3/1997 |
|---|---|---|
| JP | 2001001787 A | 1/2001 |

(Continued)

*Primary Examiner* — Khoi H Tran
*Assistant Examiner* — Rodney P King
(74) *Attorney, Agent, or Firm* — Hunton Andrews Kurth LLP

(57) ABSTRACT

A control system for hybrid vehicles to properly select an operating mode during autonomous operation is provided. An operating mode of the hybrid vehicle is selected from a hybrid mode and an electric vehicle mode. A controller that is configured to: determine an existence of a passenger in a vehicle compartment; select the electric vehicle mode in a case that the hybrid vehicle is operated autonomously while carrying the passenger; and select the hybrid mode in a case that the hybrid vehicle is operated autonomously without carrying the passenger.

7 Claims, 12 Drawing Sheets

(51) Int. Cl.
  *B60W 10/08* (2006.01)
  *B60W 10/20* (2006.01)
  *B60W 20/20* (2016.01)
  *B60N 2/00* (2006.01)
  *G05D 1/00* (2006.01)
  *G05D 1/02* (2020.01)
  *B60W 20/10* (2016.01)
  *B60W 20/17* (2016.01)
  *B60W 20/13* (2016.01)
  *B60W 10/18* (2012.01)

(52) U.S. Cl.
  CPC ... *B60W 2510/244* (2013.01); *B60W 2520/10* (2013.01); *B60W 2520/105* (2013.01); *B60W 2520/125* (2013.01); *B60W 2520/14* (2013.01); *B60W 2530/18* (2013.01); *B60W 2540/10* (2013.01); *B60W 2540/12* (2013.01); *B60W 2540/18* (2013.01); *B60W 2710/0666* (2013.01); *B60W 2710/0677* (2013.01); *B60W 2710/083* (2013.01); *B60W 2710/244* (2013.01); *G05D 2201/0213* (2013.01); *Y10S 903/91* (2013.01); *Y10S 903/93* (2013.01)

(56) References Cited

FOREIGN PATENT DOCUMENTS

| | | |
|---|---|---|
| JP | 2003134607 A | 5/2003 |
| JP | 2003134608 A | 5/2003 |
| JP | 2010064522 A | 3/2010 |
| JP | 2010209803 A | 9/2010 |
| JP | 2014088094 A | 5/2014 |
| JP | 2014-106854 A | 6/2014 |
| JP | 2016099713 A | 5/2016 |
| JP | 2016102441 A | 6/2016 |

CONTROL SYSTEM FOR HYBRID VEHICLE

CROSS REFERENCE TO RELATED APPLICATIONS

The present invention claims the benefit of priority to Japanese Patent Application No. 2016-164484 filed on Aug. 25, 2016 with the Japanese Patent Office, the entire contents of which are incorporated herein by reference in its entirety.

BACKGROUND

Field of the Invention

Embodiments of the present application relate to the art of a control system for a hybrid vehicle configured to operate the hybrid vehicle autonomously.

Discussion of the Related Art

JP-A-2014-106854 describes an automatic driving vehicle control apparatus includes: detection means for acquiring at least any of vehicle traveling state, vehicle surrounding state, and driver state; automatic driving means for automatically driving a vehicle; and determination means for determining whether a condition for automatic driving is satisfied or not. According to the teachings of JP-A-2014-106854, the determination means determines that the automatic driving condition is not satisfied when detection accuracy of the detection means does not satisfy a predetermined criterion. When the determination means determines that the automatic driving condition is satisfied, the vehicle is started the automatic driving. By contrast, when the determination means determines that the automatic driving condition is not satisfied during automatic driving, a warning is given to a driver to cancel the automatic driving. The automatic driving vehicle control apparatus taught by JP-A-2014-106854 is further configured to periodically calculate a stop spot where the vehicle can be safely stopped based on the vehicle surrounding state and the vehicle traveling state, and to guide the vehicle to the stop spot when the driver does not cancel the automatic driving against the warning to cancel the automatic driving.

The vehicle to which the control apparatus taught by JP-A-2014-106854 is applied may be operated with or without a driver or passenger. Given that the control apparatus taught by JP-A-2014-106854 is applied to a hybrid vehicle, an operating mode of the hybrid vehicle is shifted between a hybrid mode in which the vehicle is powered at least by an engine and an electric vehicle mode in which the vehicle is powered by the motor in spite of the presence or absence of the passenger.

In the hybrid mode, vibrations and noises are caused inevitably during operation of the engine and this may reduce ride comfort in comparison with the electric mode. In addition, if the electric vehicle mode is continued too long, a state of charge level of a battery falls excessively to cause a shortage of electricity.

SUMMARY

Aspects of embodiments of the present disclosure have been conceived noting the foregoing technical problems, and it is therefore an object of the present disclosure is to provide a control system for a hybrid vehicle configured to properly select an operating mode of the hybrid vehicle during autonomous operation.

The control system according to the embodiments of the present disclosure is applied to a hybrid vehicle comprising a prime mover including an engine and a motor. The control system is configured to operate the hybrid vehicle autonomously, and an operating mode of the hybrid vehicle may be selected from a hybrid mode in which the hybrid vehicle is powered at least by the engine, and an electric vehicle mode in which the hybrid vehicle is powered by the motor while stopping the engine. In order to achieve the above-explained objective, according to the embodiments of the present disclosure, the control system is provided with a controller that is configured to: determine an existence of a passenger in a vehicle compartment; select the electric vehicle mode in a case that the hybrid vehicle is operated autonomously while carrying the passenger; and select the hybrid mode in a case that the hybrid vehicle is operated autonomously without carrying the passenger.

In a non-limiting embodiment, the hybrid vehicle may also be operated manually by a driver. In addition, the controller may be further configured to: set a lower limit threshold value of a state of charge level of a battery connected to the motor; select the hybrid mode in a case that the state of charge level of the battery falls below the lower limit threshold value; set the lower limit threshold value to a first lower limit threshold value in a case that the hybrid vehicle is operated manually; and set the lower limit threshold value to a second lower limit threshold value that is lower than the first lower limit threshold value in the case that the hybrid vehicle is operated autonomously while carrying the passenger.

In a non-limiting embodiment, the controller may be further configured to: control a state of charge level of a battery connected to the motor based on a target value; set the target value of a state of charge level of the battery to a first target value in a case that the hybrid vehicle is operated manually; and set the target value of a state of charge level of the battery to a second target value that is higher than the first target value in the case that the hybrid vehicle is operated autonomously without carrying the passenger.

In a non-limiting embodiment, the hybrid vehicle may further comprise a sensor for detecting a speed of the hybrid vehicle. In addition, the controller may be further configured to select the hybrid mode in a case that the hybrid vehicle is operated autonomously while carrying the passenger, and that the speed of the hybrid vehicle is higher than a predetermined threshold value.

In a non-limiting embodiment, the hybrid vehicle may further comprise a sensor for detecting a noise level in the vehicle compartment. In addition, the controller may be further configured to select the hybrid mode in a case that the hybrid vehicle is operated autonomously while carrying the passenger, and that the noise level in the vehicle compartment is higher than a predetermined level.

In a non-limiting embodiment, the controller may be further configured to shift the operating mode of the hybrid vehicle to the hybrid mode after travelling a predetermined distance or after elapse of a predetermined period of time, in a case that all of the passengers have left the hybrid vehicle propelled in the electric vehicle mode.

In a non-limiting embodiment, the hybrid vehicle may further comprise a sensor for detecting a person around the hybrid vehicle. In addition, the controller may be further configured to shift the operating mode of the hybrid vehicle to the hybrid mode in a case that all of the passengers have left the hybrid vehicle propelled in the electric vehicle mode and that no one is detected around the vehicle by the sensor.

In a non-limiting embodiment, the hybrid vehicle may further comprise a device arranged in the vehicle compartment. In addition, the controller may be further configured to determine an existence of the passenger in the vehicle compartment based on an operating state or activating state of the device.

Thus, according to the embodiments of the present disclosure, the controller determines an existence of a passenger in the hybrid vehicle propelling autonomously, and shifts the operating mode of the hybrid vehicle to the electric vehicle mode in which the hybrid vehicle is powered by the motor while stopping the engine, when the hybrid vehicle is operated autonomously while carrying the passenger. According to the embodiments of the present disclosure, therefore, vibrations and noises of the engine will not be sensed by the passenger when the hybrid vehicle is operated autonomously while carrying the passenger.

As described, the controller is further configured to set the lower limit threshold value of a state of charge level of the battery to the second lower limit threshold value that is lower than the first lower limit threshold value in the case that the hybrid vehicle is operated autonomously while carrying the passenger. According to the embodiments of the present disclosure, therefore, the electric vehicle mode is selected on a preferential basis to improve ride comfort when the vehicle is operated autonomously while carrying the passenger.

As also described, the controller is further configured to set the target value of a state of charge level of the battery to the second target value that is higher than the first target value when the hybrid vehicle is operated autonomously without carrying the passenger. According to the embodiments of the present disclosure, therefore, the battery may be charged to the higher level during propulsion in the hybrid mode without carrying the passenger. For this reason, the hybrid vehicle can be propelled in the electric vehicle mode for a longer period of time on the next opportunity.

As also described, the controller is further configured to select the hybrid mode in a case that the hybrid vehicle is operated autonomously while carrying the passenger, and that the speed of the hybrid vehicle is higher than a predetermined threshold value. If the vehicle speed is high, a background noise in the vehicle compartment exerts greater influence on ride comfort rather than the vibrations and noises of the engine, and hence the vibrations and noises of the engine may not be sensed by the passenger even if the engine is started. In this case, therefore, the operating mode of the vehicle is shifted to the hybrid mode so that the engine is operated at high speed in an optimum fuel efficient manner. In addition, the battery may be charged sufficiently during propulsion in the hybrid mode so that the hybrid vehicle can be propelled in the electric vehicle mode for a longer period of time on the next opportunity.

As also described, the controller is further configured to select the hybrid mode in the case that the hybrid vehicle is operated autonomously while carrying the passenger, and that the noise level in the vehicle compartment is higher than a predetermined level. If the background noise in the vehicle compartment is high, the vibrations and noises of the engine may not be sensed by the passenger even if the engine is started. In this case, therefore, the operating mode of the vehicle is also shifted to the hybrid mode so that the engine is operated at high speed in an optimum fuel efficient manner. In addition, the battery may also be charged sufficiently during propulsion in the hybrid mode so that the hybrid vehicle can be propelled in the electric vehicle mode for a longer period of time on the next opportunity.

As also described, the controller is further configured to shift the operating mode of the hybrid vehicle to the hybrid mode after travelling a predetermined distance or after elapse of a predetermined period of time, in the case that all of the passengers have left the hybrid vehicle propelled in the electric vehicle mode. In this case, therefore, the operating mode of the hybrid vehicle is shifted from the electric vehicle mode to the hybrid mode after the hybrid vehicle has moved sufficiently away from the passenger getting off of the hybrid vehicle. For this reason, the vibrations and noises of the engine will not bother people around the vehicle.

As also described, the controller is further configured to shift the operating mode of the hybrid vehicle to the hybrid mode in the case that all of the passengers have left the hybrid vehicle propelled in the electric vehicle mode and that no one is detected around the vehicle by the sensor. In this case, therefore, the vibrations and noises of the engine will not bother people around the vehicle.

In addition, an existence of the passenger in the vehicle compartment may also be detected based on an operating state or activating state of the existing device.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Preferred embodiments of the present application will now be explained with reference to the accompanying drawings.

Figure 1:
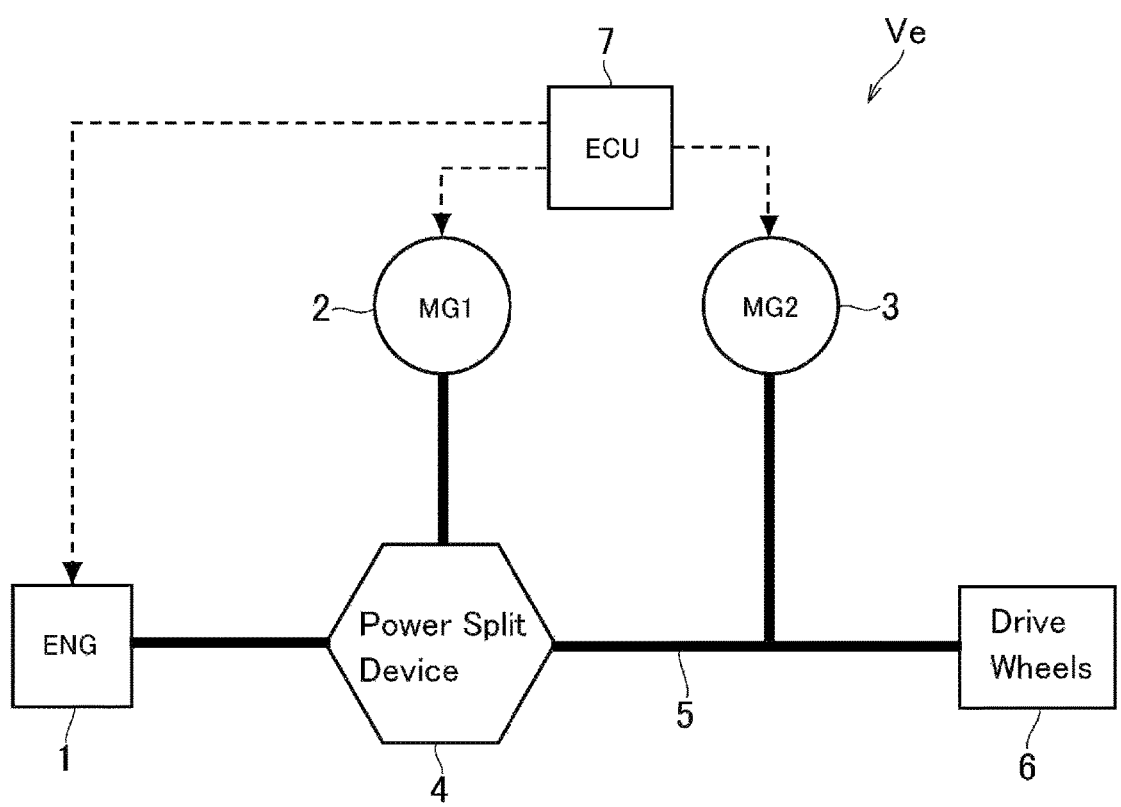
FIG. 1 is a schematic illustration showing a first example of a drive system of the hybrid vehicle.

Referring now to FIG. 1, there is schematically shown a first example of a drive system of the hybrid vehicle Ve. As shown in FIG. 1, a prime mover of a vehicle Ve includes an engine (referred to as "ENG" in FIG. 1) 1, a first motor 2 (referred to as "MG1" in FIG. 1) and a second motor (referred to as "MG2" in FIG. 1) 3. The vehicle Ve comprises a power split device 4, an output member 5, drive wheels 6, and a controller 7.

Specifically, an internal combustion engine such as a gasoline engine and a diesel engine may be used as the engine 1. An output power of the engine 1 may be adjusted electrically, and the engine 1 may be started and stopped electrically according to need. For example, given that the gasoline engine is used as the engine 1, an opening degree of a throttle valve, an amount of fuel supply, a commencement and a termination of ignition, an ignition timing etc. may be controlled automatically.

A permanent magnet type synchronous motor or an induction motor having a generating function, that is, a motor-generator may be used individually as the first motor 2 and the second motor 3. The first motor 2 and the second motor 3 are connected to each other through a battery and an inverter (neither of which are shown) so that rotational speeds and torques thereof can be controlled responsive to a current applied thereto, and hence those motor 2 and 3 can be operated selectively as a motor and a generator. In the vehicle Ve shown in FIG. 1, therefore, an electric power generated by the first motor 2 can be supplied to the second motor 3 to generate torque, and the torque of the second motor 3 can be applied to drive wheels 6 to propel the vehicle Ve.

The power split device 4 is a planetary gear unit comprising an input element, a reaction element and an output element. In the power split device 4, the input element is connected to the engine 1, the reaction element is connected to the first motor 2, and the output element is connected to the drive wheels 6 through an output member 5. In the vehicle Ve, an output torque of the engine 1 is distributed to the first motor 2 and to the drive wheels 6 through the power split device 4, and an output torque of the first motor 2 is delivered not only to the drive wheels 6 but also to the engine 1 to start the engine 1.

In the vehicle Ve, not only front wheels but also rear wheels may serve as the drive wheels 6. Alternatively, all of the front and rear wheels may be rotated to serve as the drive wheels 6. Each of the front wheels and rear wheels is individually provided with a brake device (not shown), and any one of the pairs of the front wheels and the rear wheels is connected to a steering device (not shown).

In order to electrically control the vehicle Ve, the vehicle Ve is provided with a controller (referred to as "ECU" in FIG. 1) 7 as an electronic control unit composed mainly of a microcomputer. For example, detection signals and information from an after-mentioned external sensor 11, a GPS receiver 12, an internal sensor 13, a map database 14, a navigation system 15 and so on are sent to the controller 7. The controller 7 may be configured to communicate with an inter-vehicle communication system to exchange data therebetween. Specifically, the controller 7 is configured to carry out a calculation based on incident data as well as data and formulas installed in advance, and to transmit calculation results in the form of command signals to the above-mentioned elements and after-mentioned actuators and auxiliaries.

An operating mode the vehicle Ve may be selected from a hybrid mode (to be abbreviated as the "HV mode" hereinafter) in which the vehicle Ve is powered at least by the engine 1, and an electric vehicle mode (to be abbreviated as the "EV mode" hereinafter) in which the vehicle Ve is powered by at least one of the first motor 2 and the second motor 3 while stopping the engine 1. The HV mode may be selected from a first HV mode in which the vehicle Ve is powered only by the engine 1, a second HV mode in which the vehicle Ve is powered by the engine 1 and at least one of the first motor 2 and the second motor 3, and a third HV mode in which the vehicle Ve is powered by the engine 1 while operating one of the motors 2 and 3 by the engine 1. On the other hand, the EV mode may be selected from a single-motor mode in which the vehicle Ve is powered only by the second motor 3, and a dual-motor mode in which the vehicle Ve is powered by both of the first motor 2 and the second motor 3.

The control system according to the embodiments of the present disclosure is configured to operate the vehicle Ve autonomously. Specifically, the control system is configured to execute a starting operation, an accelerating operation, a steering operation, a braking operation, a stopping operation and etc. of the vehicle Ve completely autonomously at the level 4 defined by the NHTSA (National Highway Traffic Safety Administration) or the level 4 or 5 defined by the SAE (Society of Automotive Engineers), while recognizing and observing an external condition and a travelling condition. For this reason, the vehicle Ve may be operated not only autonomously with or without a driver (and a passenger) but also manually by the driver.

Figure 2:
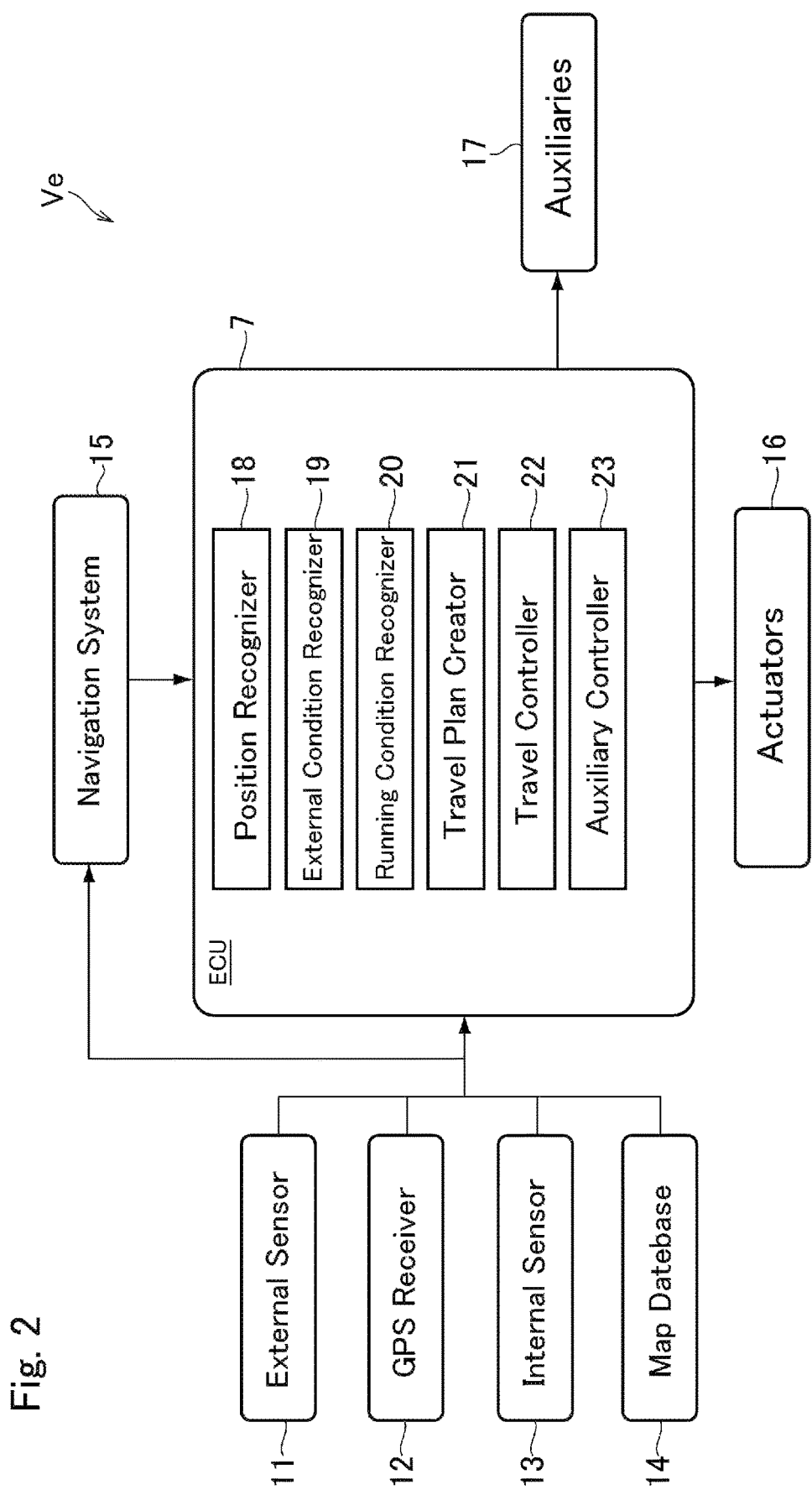
FIG. 2 is a schematic illustration showing a control system of the hybrid vehicle according to the embodiment of the present disclosure.

Configuration of the controller 7 is shown in FIG. 2 in more detail. As shown in FIG. 2, detection signals and information from the external sensor 11, the GPS receiver 12, the internal sensor 13, the map database 14, the navigation system 15 and so on are sent to the controller 7. Although only one controller 7 is depicted in FIG. 2, a plurality of controllers may be arranged in the vehicle Ve to control the above-mentioned devices individually.

The external sensor 11 includes at least one of the following external sensors for detecting an external condition, such as an on-board camera, a RADAR (i.e., a radio detection and ranging) a LIDAR (i.e., a laser imaging detection and ranging), an ultrasonic sensor and so on.

Specifically, the on-board camera is arranged e.g., in a front part and both sides of the vehicle Ve, and transmits recorded information about the external condition to the controller 7. To this end, not only a monocular camera but also a stereo camera having a plurality of lenses and image sensors to achieve a binocular vision may be used as the on-board camera. If the stereo camera is used as the on-board camera, the controller 7 is allowed to obtain three-dimensional information of the recorded object.

The RADAR is adapted to detect obstacles utilizing radio waves such as millimetric-waves and microwaves, and to transmit detected information to the controller 7. Specifically, the RADAR detects an obstacle such as other vehicles and so on by emitting radio waves and analyzing the radio waves reflected from the obstacle.

The LIDAR (or a laser sensor and a laser scanner) is adapted to detect obstacles utilizing laser light and to transmit detected information to the controller 7. Specifically, the LIDAR detects an obstacle such as other vehicles and so on by emitting laser light and analyzing the laser light reflected from the obstacle.

The ultrasonic sensor is adapted to detect obstacles utilizing ultrasonic and to transmit detected information to the controller 7. Specifically, the ultrasonic sensor detects an obstacle such as other vehicles and so on by emitting ultrasonic and analyzing the ultrasonic reflected from the obstacle.

The GPS receiver is adapted to obtain a position (i.e., latitude and longitude) of the vehicle Ve based on incident signals from GPS satellites, and to transmit the positional information to the controller 7.

The internal sensor 13 is adapted to detect operating conditions and behaviors of the constituent elements of the vehicle Ve. Specifically, the internal sensor 13 includes a vehicle speed sensor for detecting a speed of the vehicle Ve, an engine speed sensor for detecting a speed of the engine 1, a motor speed sensor (or a resolver) for detecting speeds of the motors 2 and 3, a throttle opening sensor for detecting an opening degree of a throttle valve, a throttle sensor for detecting an opening degree of an accelerator, a brake sensor (or switch) for detecting a depression of a brake pedal, an accelerator sensor for detecting a position of an accelerator pedal, a steering sensor for detecting a steering angle of the steering device, a longitudinal acceleration sensor for detecting a longitudinal acceleration of the vehicle Ve, a lateral acceleration sensor for detecting a lateral acceleration of the vehicle Ve, a yaw rate sensor for detecting a yaw rate of the vehicle Ve, a battery sensor for detecting a state of charge (to be abbreviated as the "SOC" hereinafter) level of a battery connected to the motors 2 and 3, a seat sensor for detecting an occupant sitting on a vehicle seat, a seatbelt sensor for detecting a fastening of a seatbelt, a biometric passenger sensor or a motion sensor for detecting a driver or passenger sitting on the vehicle seat.

The map database 14 may be installed in the controller 7, but map information stored in external online information processing systems may also be available.

The navigation system 15 is configured to determine a travelling route of the vehicle Ve based on the positional information obtained by the GPS receiver and the map database 14.

The controller 7 carries out calculations based on the incident data or information from the external sensor 11, the GPS receiver 12, the internal sensor 13, the map database 14 and the navigation system 15, and calculation results are sent in the form of command signal to the actuators 16 of the elements to be actuated to operate the vehicle Ve autonomously and the auxiliaries 17.

The actuators 16 include a throttle actuator, a brake actuator, a steering actuator and so on, and the vehicle Ve may be operated autonomously by manipulating the actuators 16.

Specifically, the throttle actuator changes an opening degree of the throttle valve of the engine 1 to generate a required power in accordance with the control signal transmitted from the controller 7. The brake actuator controls the brake device to generate a required braking force applied to the vehicle Ve in accordance with the control signal transmitted from the controller 7. The steering actuator actuates an assist motor of an electric power steering device to turn the vehicle Ve in accordance with the control signal transmitted from the controller 7.

The auxiliaries 17 include devices that are not involved in propulsion of the vehicle Ve such as a wiper, a headlight, a direction indicator, an air conditioner, an audio player and so on.

The controller 7 includes a position recognizer 18, an external condition recognizer 19, a running condition recognizer 20, a travel plan creator 21, a travel controller 22, an auxiliary controller 23 and so on.

The position recognizer 18 is configured to recognize a current position of the vehicle Ve on a map based on positional information received by the GPS receiver 12 and the map database 14. The current position of the vehicle Ve may also be obtained from the positional information used in the navigation system 15. Optionally, the vehicle Ve may also be adapted to communicate with external sensors and signposts arranged along the road to obtain the current position of the vehicle Ve.

The external condition recognizer 19 is configured to recognize external condition of the vehicle Ve such as a location of a traffic lane, a road width, a road configuration, a road gradient, an existence of obstacles around the vehicle Ve and so on, based on the recorded information of the on-board camera, or detection data of the RADAR or the LIDAR. Optionally, weather information, a friction coefficient of road surface etc. may be obtained according to need.

The running condition recognizer 20 is configured to recognize running condition of the vehicle Ve such as a vehicle speed, a longitudinal acceleration, a lateral acceleration, a yaw rate and so on based on detection result of the internal sensors 13.

The travel plan creator 21 is configured to create a travel locus of the vehicle Ve based on a target course determined by the navigation system 15, a position of the vehicle Ve recognized by the position recognizer 18, and an external condition recognized by the external condition recognizer 19. That is, the travel plan creator 21 creates a travel locus of the vehicle Ve within the target course in such a manner that the vehicle Ve is allowed to travel safely and properly while complying traffic rules. In addition, the travel plan creator 21 is further configured to create a travel plan in line with the travel locus and the target course created based on the recognized external conditions and the map database 14.

Specifically, the travel plan is created based on prospective data after few seconds from the present moment to determine a future condition of the vehicle Ve such as a driving force or the like required in future. Optionally, the travel plan may also be created based on prospective data after several ten seconds depending on the external conditions and the running conditions. Thus, the travel plan creator 21 creates a future plan to change a vehicle speed, acceleration, steering torque etc. during travelling along the target course in the form of e.g., a map.

Alternatively, the travel plan creator 21 may also create a pattern to change the vehicle speed, acceleration, steering torque etc. between predetermined points on the travel locus. Specifically, such patterns may be determined by setting target values of those parameters at each point on the travel locus taking account of a required time to reach the point at the current speed.

The travel controller 22 is configured to operate the vehicle Ve autonomously in line with the travel plan created by the travel plan creator 21. To this end, specifically, the travel controller 22 transmits command signals to the throttle actuator, the brake actuator, the steering actuator, the engine 1, the first motor 2, the second motor 3 and so on in accordance with the travel plan.

The auxiliary controller 23 is configured to operate the auxiliaries 17 such as the wiper, the headlight, the direction indicator, the air conditioner, the audio player and so on in line with the travel plan created by the travel plan creator 21.

Details of autonomous operation of the vehicle in line with the travel plan are described in more detail in the publication of JP-A-2016-99713. According to the embodiments of the present disclosure, the vehicle Ve may be operated not only completely autonomously utilizing e.g., the teachings of JP-A-2016-99713, but also manually by the driver.

As described, vibrations and noises are caused inevitably by a combustion of fuel, pulsations of torque etc. during operation of the engine 1. That is, in the HV mode, ride comfort is reduced in comparison with the EV mode. On the other hand, propulsion in the EV mode has to be restricted if the SOC level of the battery is too low.

Figure 3:
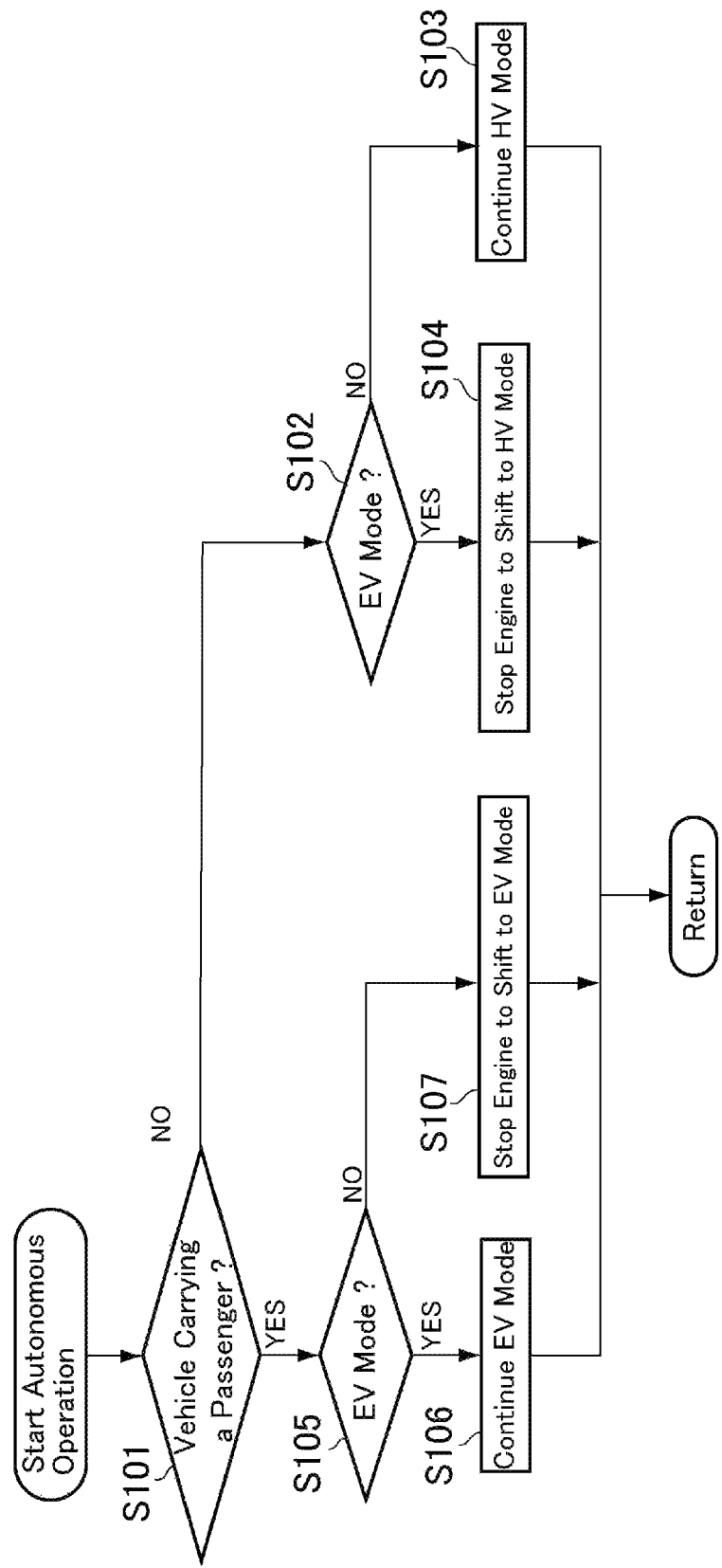
FIG. 3 is a flowchart showing a first control example executed by the control system.

The controller 7 according to the embodiments of the present disclosure is configured to properly select the operating mode of the vehicle Ve taking account of the SOC level of the battery Turning to FIG. 3, there is shown a first control example executed by the controller 7 when starting an autonomous operation of the vehicle Ve. For example, if the vehicle Ve is adapted to be operated only autonomously, the routine shown in FIG. 3 is commenced when starting the vehicle Ve. By contrast, if the vehicle Ve is adapted to be operated not only autonomously but also manually, the routine shown in FIG. 3 is commenced when starting the autonomous operation of the vehicle Ve.

First of all, a presence of the passenger in a vehicle compartment is determined at step S101. Such determination at step S101 may be made based on a detection signal of a body temperature of the passenger from the biometric passenger sensor such as an infrared sensor, a detection signal of a body movement of the passenger from a motion sensor such as a doppler sensor, or a detection signal of an occupancy of the vehicle seat from the seat sensor. Alternatively, the determination at step S101 may also be made based on an operating state or activating state of the devices arranged in the vehicle compartment. In this case, a presence the passenger may be determined based on a fact that a power switch, an ignition switch, a start button or the like is turned on.

If a presence of the passenger in the vehicle compartment is not detected so that the answer of step S101 is NO, that is, if the vehicle Ve is propelled autonomously without carrying a passenger, the routine progresses to step S102 to determine whether or not the vehicle Ve is currently propelled in the EV mode.

If the vehicle Ve is not propelled in the EV mode so that the answer of step S102 is NO, that is, if the vehicle Ve is currently propelled in the HV mode, the routine progresses to step S103 to continue the HV mode. Then, the routine returns.

By contrast, if the vehicle Ve is currently propelled in the EV mode so that the answer of step S102 is YES, the routine progresses to step S104 to shift the operating mode of the vehicle Ve from the EV mode to the HV mode by starting the engine 1. Then, the routine returns.

Thus, in the case that the vehicle Ve is operated autonomously without carrying a passenger, the HV mode is selected on a preferential basis. In this case, the vibrations and noises resulting from operation of the engine 1 will not be sensed by the passenger. In addition, the battery may be charged during propulsion in the HV mode so that the SOC level of the battery may be maintained to a preferable level.

By contrast, if a presence of the passenger in the vehicle compartment is detected so that the answer of step S101 is YES, the routine progresses to step S105 to determine whether or not the vehicle Ve is currently propelled in the EV mode.

If the vehicle Ve is propelled in the EV mode so that the answer of step S105 is YES, the routine progresses to step S106 to continue the EV mode. Then, the routine returns.

If the vehicle Ve is not propelled in the EV mode so that the answer of step S105 is NO, that is, if the vehicle Ve is currently propelled in the HV mode, the routine progresses to step S107 to shift the operating mode of the vehicle Ve from the HV mode to the EV mode by stopping the engine 1. Then, the routine returns.

Thus, in the case that the vehicle Ve is operated autonomously while carrying a passenger, the EV mode is selected on a preferential basis. In this case, the vibrations and noises of the engine 1 will not be generated to improve ride comfort.

Figure 4:
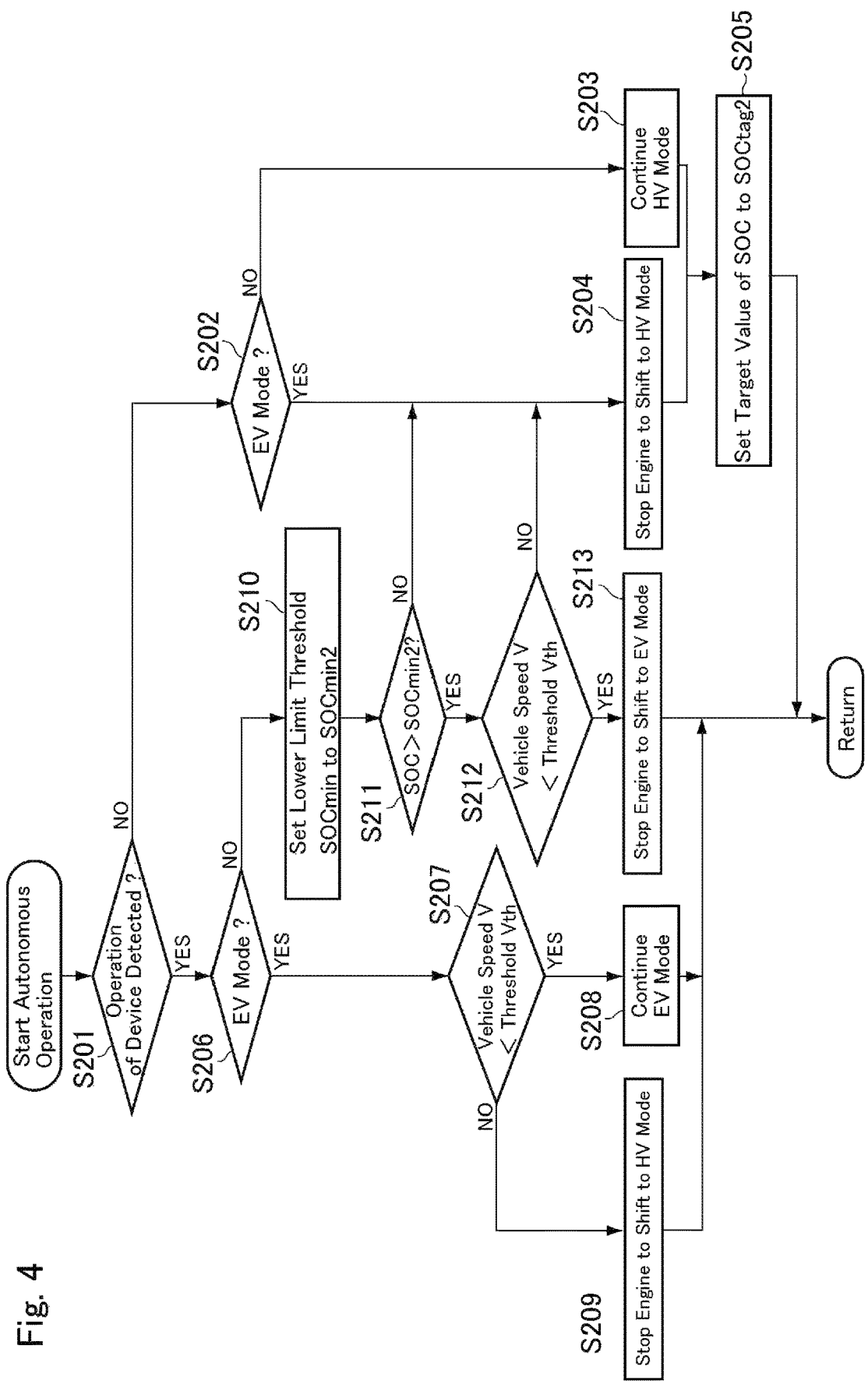
FIG. 4 is a flowchart showing a second control example executed by the control system.

FIG. 4 shows the second control example executed by the controller 7 to select the operating mode of the vehicle Ve during the autonomous operation. As the first control example shown in FIG. 3, the routine shown in FIG. 4 is also executed when starting the autonomous operation of the vehicle Ve.

First of all, a presence of the passenger in the vehicle compartment is determined at step S201 based on an operation or activation of the device arranged in the vehicle compartment. For example, at step S201, a presence of the passenger in the vehicle compartment may be made based on a fact that: a key of the vehicle Ve is in the vehicle compartment; the ignition switch, the start button or the like is operated; the seat sensor detects an occupant sitting on the vehicle seat; the steering wheel is turned; a shift lever is moved; the accelerator pedal is depressed or returned; and the brake pedal is depressed or returned.

If the operation or activation of the device arranged in the vehicle compartment is not detected so that the answer of step S201 is NO, that is, if the vehicle Ve is propelled autonomously without carrying a passenger, the routine progresses to step S202 to determine whether or not the vehicle Ve is currently propelled in the EV mode.

If the vehicle Ve is not propelled in the EV mode so that the answer of step S202 is NO, that is, if the vehicle Ve is currently propelled in the HV mode, the routine progresses to step S203 to continue the HV mode. Then, the routine returns.

By contrast, if the vehicle Ve is currently propelled in the EV mode so that the answer of step S202 is YES, the routine progresses to step S204 to shift the operating mode of the vehicle Ve from the EV mode to the HV mode by starting the engine 1.

Thus, in the case that the vehicle Ve is operated autonomously without carrying a passenger, the HV mode is also selected on a preferential basis. In this case, the battery may be charged during propulsion in the HV mode so that the SOC level of the battery may be maintained to the preferable level.

Subsequent to step S203 or S204, a target value $SOC_{tag}$ of a state of charge level of the battery is set to a second target value $SOC_{tag2}$ at step S205. For example, if the target value $SOC_{tag}$ is currently set to a first target value $SOC_{tag1}$, the target value $SOC_{tag}$ is altered from the first target value $SOC_{tag1}$ to the second target value $SOC_{tag2}$. By contrast, if the target value $SOC_{tag}$ has already been set to the second target value $SOC_{tag2}$, the target value $SOC_{tag}$ is maintained to the second target value $SOC_{tag2}$.

Basically, the target value $SOC_{tag}$ of the battery is set to the first target value $SOC_{tag1}$ in a normal condition. For example, the target value $SOC_{tag}$ of the battery is set to the first target value $SOC_{tag1}$ when the vehicle Ve is operated manually by the driver, and when the vehicle Ve is propelled autonomously in the EV mode without carrying the passenger.

The second target value $SOC_{tag2}$ is greater (or higher) than the first target value $SOC_{tag1}$. Such alteration of the target value $SOC_{tag}$ of the battery at step S205 is executed only in the hybrid vehicle that can be operated not only autonomously but also manually by the driver. In the vehicle Ve of this kind, the SOC level of the battery connected to at least one of the first motor 2 and the second motor 3 (or at least one of a below-mentioned motor 41, a first motor 52 and a second motor 53) is adjusted to the selected target value $SOC_{tag}$ by the controller 7. As described, the target value $SOC_{tag}$ of the battery is set to the first target value $SOC_{tag1}$ during operating the vehicle Ve manually by the driver. By contrast, in the case that the vehicle Ve is operated autonomously in the HV mode without carrying the passenger, the target value $SOC_{tag}$ of the battery is set to the second target value $SOC_{tag2}$ at step S205. Then, the routine returns.

Thus, in the case that the vehicle Ve is operated autonomously in the HV mode without carrying the passenger, the second target value $SOC_{tag2}$ is selected so that the battery can be charged to the higher level during propulsion in the HV mode in comparison with the case of operating the vehicle Ve manually. For this reason, the vehicle Ve is allowed to be propelled in the EV mode for a longer period of time on the next opportunity to propel the vehicle Ve in the EV mode. If the vehicle Ve is adapted to be operated only autonomously, the routine skips step S205 and returns.

By contrast, if the operation or activation of the device arranged in the vehicle compartment is detected so that the answer of step S201 is YES, that is, if the vehicle Ve is propelled autonomously while carrying a passenger, the routine progresses to step S206 to determine whether or not the vehicle Ve is currently propelled in the EV mode.

If the vehicle Ve is propelled in the EV mode so that the answer of step S206 is YES, the routine progresses to step S207 to determine whether or not a current vehicle speed V is lower than a threshold value Vth so as to determine a level of a background noise in the vehicle compartment that is increased with an increase in the vehicle speed V To this end, the threshold value Vth is determined in advance based on a result of simulation or experimentation. Specifically, if the vehicle speed V is lower than the threshold value Vth, the controller 7 determines that the vibrations and noises resulting from operation of the engine 1 reduces ride comfort rather than the background noise. By contrast, if the vehicle speed V is higher than the threshold value Vth, the controller 7 determines that the background noise reduces ride comfort rather than the vibrations and noises resulting from operation of the engine 1.

If the vehicle speed V is lower than the threshold value Vth so that the answer of step S207 is YES, the routine progresses to step S208 to continue the EV mode. Then, the routine returns.

Thus, in the case that the vehicle speed V is lower than the threshold value Vth during the autonomous operation while carrying a passenger, the EV mode is selected on a preferential basis. In this case, the vibrations and noises of the engine 1 will not be generated to improve ride comfort.

By contrast, if the vehicle speed V is higher than the threshold value Vth so that the answer of step S207 is NO, the routine progresses to step S209 to shift the operating mode of the vehicle Ve from the EV mode to the HV mode by starting the engine 1. Then, the routine returns.

As described, in the case that the vehicle speed V is higher than the threshold value Vth, the background noise exerts greater influence on ride comfort rather than the vibrations and noises of the engine 1, and hence the vibrations and noises of the engine 1 may not be sensed by the passenger even if the engine 1 is started. In this case, therefore, the operating mode of the vehicle Ve is shifted to the HV mode so that the engine 1 is operated at high speed in an optimum fuel efficient manner. In addition, the battery may be charged during propulsion in the HV mode so that the SOC level of the battery may be maintained to a preferable level.

If the vehicle Ve is not propelled in the EV mode so that the answer of step S201 is NO, that is, if the vehicle Ve is currently propelled in the HV mode, the routine progresses to step S210 to set a lower limit threshold value $SOC_{min}$ of the battery is set to a second lower limit threshold value $SOC_{min2}$. For example, if the lower limit threshold value $SOC_{min}$ is currently set to a first lower limit threshold value $SOC_{min1}$, the lower limit threshold value $SOC_{min}$ is altered from the first lower limit threshold value $SOC_{min1}$ to the second lower limit threshold value $SOC_{min2}$. By contrast, if the lower limit threshold value $SOC_{min}$ has already been set to the second lower limit threshold value $SOC_{min2}$, the lower limit threshold value $SOC_{min}$ is maintained to the second lower limit threshold value $SOC_{min2}$.

Basically, the lower limit threshold value $SOC_{min}$ of the battery is set to the first lower limit threshold value $SOC_{min1}$ in a normal condition. For example, the lower limit threshold value $SOC_{min}$ of the battery is set to the first lower limit threshold value $SOC_{min1}$ when the vehicle Ve is operated manually by the driver, and when the vehicle Ve is propelled autonomously in the EV mode without carrying the passenger.

The second lower limit threshold value $SOC_{min2}$ is smaller (or lower) than the first lower limit threshold value $SOC_{min1}$. Such alteration of the lower limit threshold value $SOC_{min}$ of the battery at step S210 and subsequent step S211 are executed only in the hybrid vehicle that can be operated not only autonomously but also manually by the driver. In the vehicle Ve of this kind, the lower limit threshold value $SOC_{min}$ is set by the controller 7 to prevent an over discharge from the battery connected to at least one of the first motor 2 and the second motor 3 (or at least one of the below-mentioned motor 41, the first motor 52 and the second motor 53). When the SOC level of the battery falls below the lower limit threshold value $SOC_{min}$, the controller 7 shift the operating mode of the vehicle Ve to the HV mode by starting the engine 1. That is, if the SOC level of the battery is higher than the lower limit threshold value $SOC_{min}$, the controller 7 selects the EV mode to propel the vehicle. In addition, when a manual operation mode is selected, the lower limit threshold value $SOC_{min}$ of the battery is set to the first lower limit threshold value $SOC_{min1}$. By contrast, in the case that the vehicle Ve is operated autonomously in the HV mode while carrying the passenger, the lower limit threshold value $SOC_{min}$ of the battery is set to the second lower limit threshold value $SOC_{min2}$ at step S210.

Thus, in the case that the vehicle Ve is operated autonomously in the HV mode while carrying the passenger, the lower limit threshold value $SOC_{min}$ of the battery is set to the second lower limit threshold value $SOC_{min2}$ so that the EV mode is selected on a preferential basis. In this case, the vibrations and noises resulting from operation of the engine 1 will not be sensed by the passenger.

Then, at step S211, it is determined whether or not the current SOC level of the battery is higher than the second lower limit threshold value $SOC_{min2}$. If the SOC level of the battery is lower than the second lower limit threshold value $SOC_{min2}$ so that the answer of step S211 is NO, the routine also progresses to the foregoing steps S204 and 205, and then the routine returns.

Thus, in the case that the SOC level of the battery falls below the second lower limit threshold value $SOC_{min2}$, the operating mode of the vehicle Ve is shifted to the HV mode. In this case, the battery may be charged during propulsion in the HV mode so that the SOC level of the battery may be maintained to the preferable level.

By contrast, if the SOC level of the battery is higher than the second lower limit threshold value $SOC_{min2}$ so that the answer of step S211 is YES, the routine progresses to Step S212. If the vehicle Ve is adapted to be operated only autonomously, the routine skips steps S210 and S211 and progresses directly to step S212.

At step S212, it is also determined whether or not the current vehicle speed V is lower than a threshold value Vth. If the vehicle speed V is higher than the threshold value Vth so that the answer of step S212 is NO, the routine also progresses to the foregoing steps S204 and 205, and then the routine returns. If the vehicle Ve is adapted to be operated only autonomously, the routine progresses to step S204 to start the engine 1, and returns without executing the alteration of the lower limit threshold value $SOC_{min}$ at steps S205.

As described, in the case that the vehicle speed V is higher than the threshold value Vth, the background noise exerts greater influence on ride comfort rather than the vibrations and noises of the engine 1. In this case, therefore, the operating mode of the vehicle Ve is shifted to the HV mode so that the engine 1 is operated at high speed in an optimum fuel efficient manner. In addition, the battery may be charged during propulsion in the HV mode so that the SOC level of the battery may be maintained to a preferable level.

By contrast, if the vehicle speed V is lower than the threshold value Vth so that the answer of step S212 is YES, the routine progresses to step S213 to shift the operating mode of the vehicle Ve from the HV mode to the EV mode by stopping the engine 1. Then, the routine returns.

As described, in the case that the vehicle speed V is lower than the threshold value Vth during the autonomous operation while carrying a passenger, the EV mode is selected on a preferential basis. In this case, the vibrations and noises of the engine 1 will not be generated to improve ride comfort.

Alternatively, the controller 7 may also be configured to determine the noise level in the vehicle compartment using a noise sensor such as a microphone arranged in the vehicle compartment. In this case, a detected noise level is compared to a threshold value of noise level at steps S207 and S212. Specifically, if the detected noise level is lower than the threshold value, the controller 7 determines that the vibrations and noises of the engine 1 exert greater influence on ride comfort rather than the background noise. By contrast, if the detected noise level is higher than the threshold value, the controller 7 determines that the background noise exerts greater influence on ride comfort rather than the vibrations and noises of the engine 1.

Figure 5:
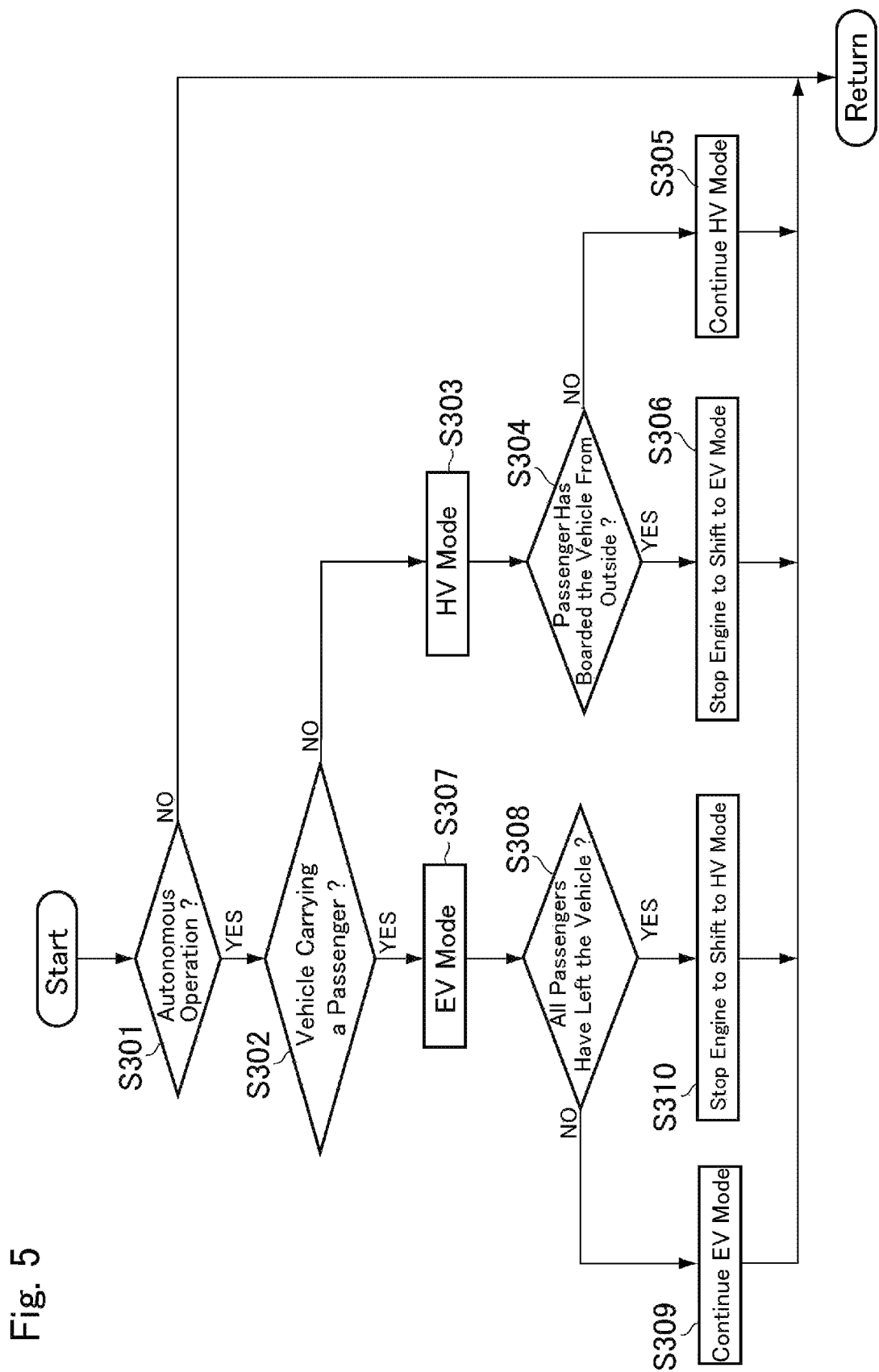
FIG. 5 is a flowchart showing a control of a third example carried out by the control system.

FIG. 5 shows the third control example executed by the controller 7 to select the operating mode of the vehicle Ve during the autonomous operation. First of all, it is determined at step S301 whether or not the vehicle Ve is currently operated autonomously. If the vehicle Ve is not operated autonomously so that the answer of step S301 is NO, the routine returns without carrying out any specific control.

By contrast, if the vehicle Ve is operated autonomously so that the answer of step S301 is YES, the routine progresses to step S302 to determine a presence of the passenger in the vehicle compartment. As described, such determination at step S302 may be made based on the detection signal of the body temperature of the passenger from the biometric passenger sensor such as the infrared sensor, the detection signal of a body movement of the passenger from the motion sensor such as the doppler sensor, or the detection signal of an occupancy of the vehicle seat from the seat sensor. Alternatively, the determination at step S302 may also be made based on an operating state or activating state of the devices arranged in the vehicle compartment.

If a presence of the passenger in the vehicle compartment is not detected so that the answer of step S302 is NO, that is, if the vehicle Ve is propelled autonomously without carrying a passenger, the routine progresses to step S303 to propel the vehicle Ve in the HV mode. Specifically, if the vehicle Ve is currently propelled in the EV mode, the operating mode of the vehicle Ve is shifted to the 1W mode. By contrast, if the vehicle Ve is currently propelled in the HV mode, the HV mode is continued.

Then, at step S304, it is determined whether or not a passenger has boarded the vehicle Ve from outside. Such determination at step S304 may be made by the same principle as step S302.

If the passenger has not boarded the vehicle Ve so that the answer of step S304 is NO, the routine progresses to step S205 to continue the HV mode, and then the routine returns.

By contrast, if the passenger has boarded the vehicle Ve so that the answer of step S304 is YES, the routine progresses to step S306 to shift the operating mode of the vehicle Ve from the HV mode to the EV mode by stopping the engine 1. Then, the routine returns.

Thus, in the case that the passenger gets on board the vehicle Ve during autonomous operation, the EV mode is selected on a preferential basis. In this case, the vibrations and noises of the engine 1 will not be generated to improve ride comfort.

By contrast, if a presence of the passenger in the vehicle compartment is detected so that the answer of step S302 is YES, that is, if the vehicle Ve is propelled autonomously while carrying a passenger, the routine progresses to step S307 to propel the vehicle Ve in the EV mode. Specifically, if the vehicle Ve is currently propelled in the HV mode, the operating mode of the vehicle Ve is shifted to the EV mode. By contrast, if the vehicle Ve is currently propelled in the EV mode, the EV mode is continued.

In this case, since the passenger has already carried by the vehicle Ve, the EV mode is also selected on a preferential basis. In this case, therefore, the vibrations and noises of the engine 1 will not be generated to improve ride comfort.

Then, at step S308, it is determined whether or not all of the passengers have left the vehicle Ve. Such determination at step S308 may also be made by the same principle as steps S302 and S304.

If all of the passengers have not yet left the vehicle Ve so that the answer of step S308 is NO, that is, at least one passenger is still carried by the vehicle Ve, the routine progresses to step S309 to continue the EV mode. Then, the routine returns.

By contrast, if all of the passengers have left the vehicle Ve so that the answer of step S308 is YES, that is, the vehicle Ve is operated autonomously without carrying the passenger, the routine progresses to step S310 to shift the operating mode of the vehicle Ve from the EV mode to the HV mode by starting the engine 1. Then, the routine returns.

As described, in the case that the vehicle Ve is operated autonomously without carrying a passenger, the HV mode is selected on a preferential basis. In this case, the vibrations and noises resulting from operation of the engine 1 will not be sensed by the passenger. In addition, the battery may be charged during propulsion in the HV mode so that the SOC level of the battery may be maintained to the preferable level.

Figure 6:
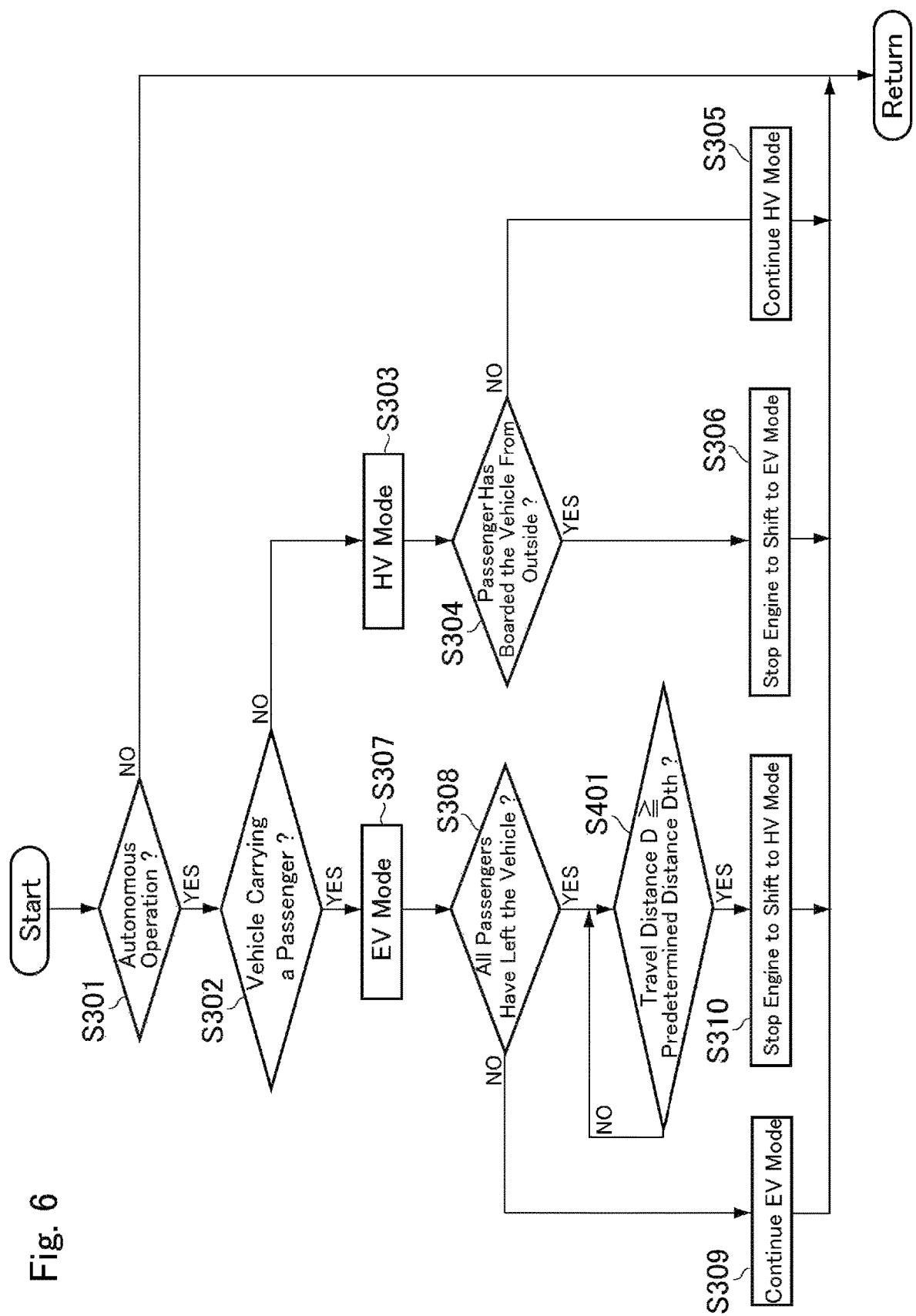
FIG. 6 is a flowchart showing a fourth control example executed by the control system.
Figure 7:
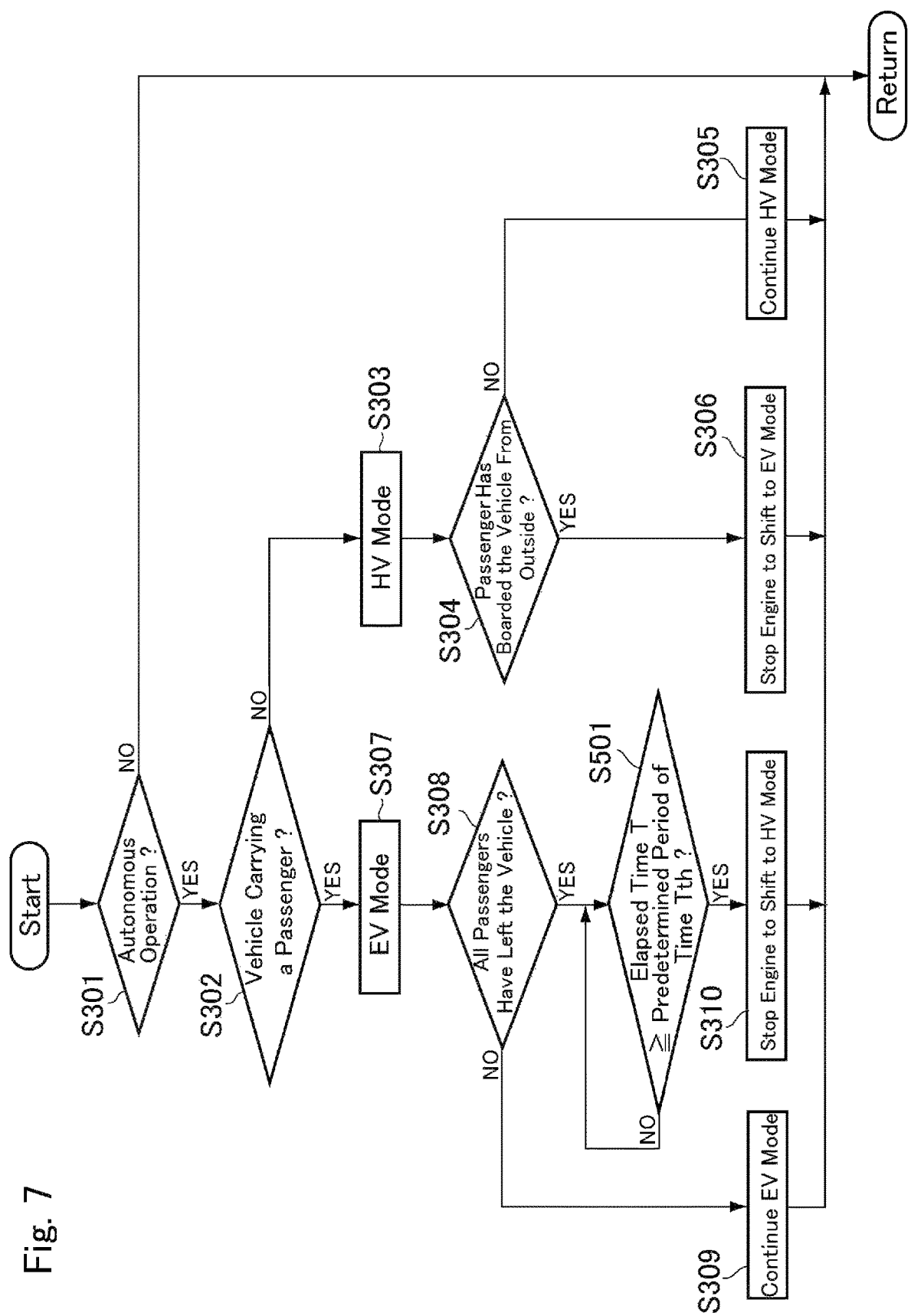
FIG. 7 is a flowchart showing a fifth control example executed by the control system.
Figure 8:
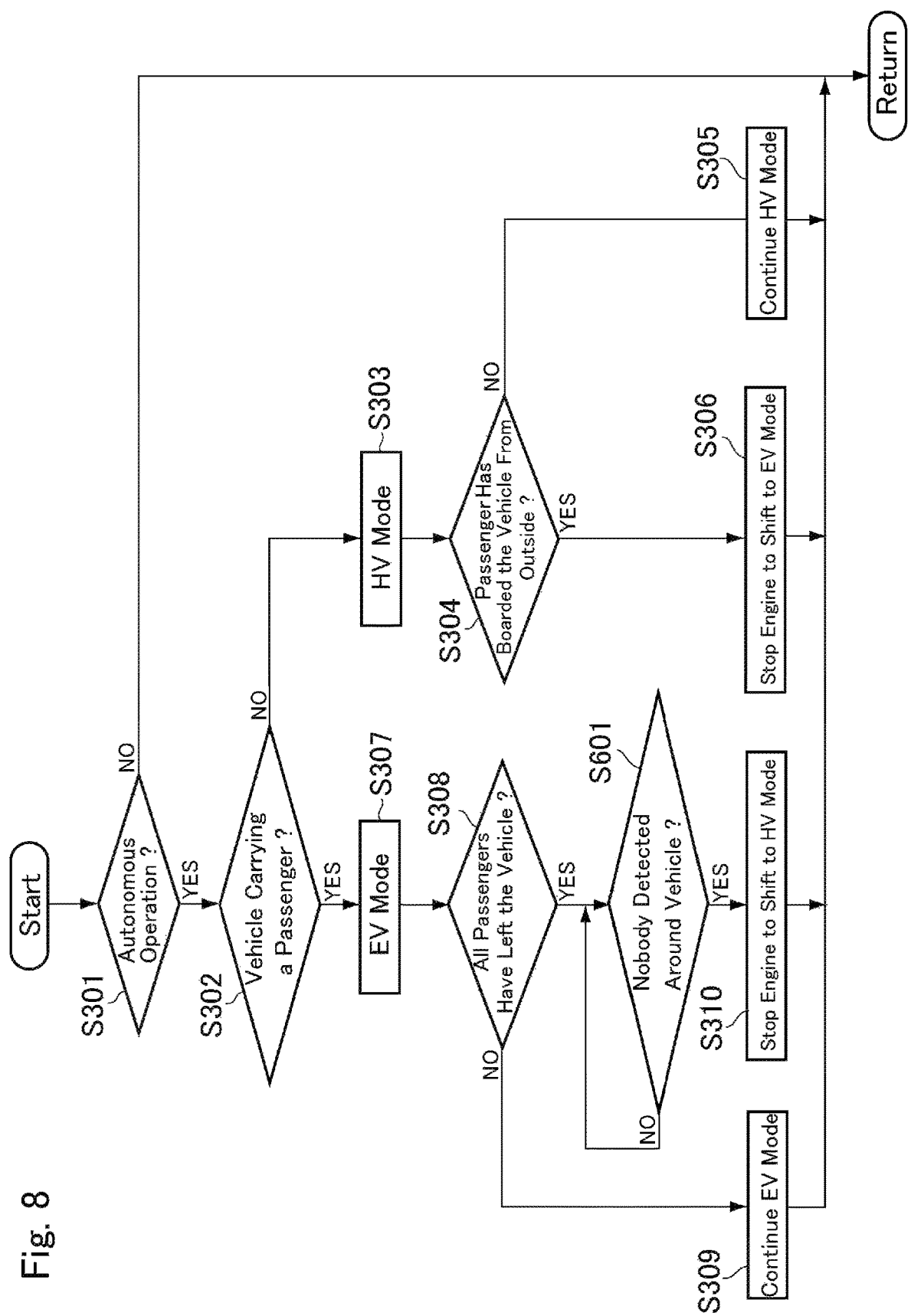
FIG. 8 is a flowchart showing a sixth control example executed by the control system.

Modification examples of the third control example are shown in FIGS. 6, 7 and 8. According to the third control example shown in FIG. 5, after all of the passengers have left the vehicle Ve, the passenger getting off of the vehicle Ve may walk around the vehicle Ve. In this situation, if the vehicle Ve is propelled in the HV mode, the vibrations and noises of the engine 1 may bother people around the vehicle Ve. According to the modification examples, therefore, the operating mode of the vehicle Ve is shifted from the EV mode to the HV mode after the vehicle Ve moves away from the passengers getting off of the vehicle Ve. In FIGS. 6, 7 and 8, common step numbers as the routine shown in FIG. 5 are allotted to the common steps.

FIG. 6 shows the fourth control example as a modification of the third control example. According to the fourth control example, if all of the passengers have left the vehicle Ve so that the answer of step S308 is YES, the routine progresses to step S401.

At step 401, it is determined whether or not the vehicle Ve has traveled a predetermined distance Dth. The predetermined distance Dth is set to a distance possible to estimate a fact that the vehicle Ve moves sufficiently away from the passengers getting off of the vehicle Ve, from a point at which the last passenger leaves the vehicle Ve and the vehicle Ve starts propelling autonomously. To this end, the predetermined distance Dth may be determined based on a result of simulation or experimentation. Specifically, the controller 7 determines that the passenger(s) getting off of the vehicle Ve is/are still remaining around the vehicle Ve until a travel distance D from the starting point of autonomous operation without carrying the passenger exceeds the predetermined distance Dth. By contrast, the controller 7 determines that the passenger(s) getting off of the vehicle Ve is/are no longer remaining around the vehicle Ve after the travel distance D exceeds the predetermined distance Dth.

If the travel distance D from the starting point of autonomous operation without carrying the passenger is shorter than the predetermined distance Dth so that the answer of step S401 is NO, the determination of step S401 is repeated until the travel distance D exceeds the predetermined distance Dth. By contrast, if the travel distance D exceeds the predetermined distance Dth so that the answer of step S401 is YES, the routine progresses to step S310 to shift the operating mode of the vehicle Ve from the EV mode to the HV mode by starting the engine 1. Then, the routine returns.

FIG. 7 shows the fifth control example as a modification of the third control example. According to the fifth control example, if all of the passengers have left the vehicle Ve so that the answer of step S308 is YES, the routine progresses to step S501.

At step 501, it is determined whether or not a predetermined period of time Tth has elapsed from a time point at which the last passenger leaves the vehicle Ve and the vehicle Ve starts propelling autonomously. The distance Tth is set to a period possible to estimate a fact that the vehicle Ve moves sufficiently away from the passengers getting off of the vehicle Ve, from the point at which the last passenger leaves the vehicle Ve and the vehicle Ve starts propelling autonomously. To this end, the period of time Tth may also be determined based on a result of simulation or experimentation. Specifically, the controller 7 determines that the passenger(s) getting off of the vehicle Ve is/are still remaining around the vehicle Ve until an elapsed time T from the time point at which the last passenger leaves the vehicle Ve and the vehicle Ve starts propelling autonomously exceeds the predetermined period of time Tth. By contrast, the controller 7 determines that the passenger(s) getting off of the vehicle Ve is/are no longer remaining around the vehicle Ve after the elapsed time T exceeds the predetermined period of time Tth.

If the elapsed time T from the starting point of autonomous operation without carrying the passenger is shorter than the predetermined period of time Tth so that the answer of step S501 is NO, the determination of step S401 is repeated until the elapsed time T exceeds the predetermined period of time Tth. By contrast, if the elapsed time T exceeds the predetermined period of time Tth so that the answer of step S501 is YES, the routine progresses to step S310 to shift the operating mode of the vehicle Ve from the EV mode to the HV mode by starting the engine 1. Then, the routine returns.

Thus, according to the fourth control example shown in FIG. 6 and the fifth control example shown in FIG. 7, the operating mode of the vehicle Ve is shifted from the EV mode to the HV mode after the vehicle Ve has moved sufficiently away from the passenger getting off of the vehicle Ve. For this reason, the vibrations and noises of the engine 1 will not bother people around the vehicle Ve.

According to the embodiments of the present disclosure, after all of the passengers leave the vehicle Ve, an existence of people around the vehicle Ve may also be detected utilizing the external sensor 11.

FIG. 8 shows the sixth control example as a modification of the third control example. According to the sixth control example, if all of the passengers have left the vehicle Ve so that the answer of step S308 is YES, the routine progresses to step S601.

At step 601, it is determined whether or not the passenger(s) getting off of the vehicle Ve is/are still remaining around the vehicle Ve after all of the passengers have left the vehicle Ve and the vehicle Ve starts propelling autonomously. Such determination at step S601 may be made based on a detection signal from the external sensor 11.

If the person around the vehicle Ve is detected so that the answer of step S601 is NO, the determination of step S601 is repeated until no one is detected around the vehicle Ve by the external sensor 11. By contrast, if no one is detected around the vehicle Ve by the external sensor 11 so that the answer of step S601 is YES, the routine progresses to step S310 to shift the operating mode of the vehicle Ve from the EV mode to the HV mode by starting the engine 1. Then, the routine returns.

Thus, according to the sixth control example shown in FIG. 8, the operating mode of the vehicle Ve is shifted from the EV mode to the HV mode after the passenger(s) getting off of the vehicle Ve is/are no longer detected by the external sensor 11. For this reason, the vibrations and noises of the engine 1 will not bother people around the vehicle Ve.

The control system according to the embodiments of the present disclosure may also be applied to the hybrid vehicles shown in FIGS. 9 to 15. In FIGS. 9 to 15, common reference numerals are allotted to the elements in common with those in FIG. 1, and detailed explanations for the common elements will be omitted in the following explanations.

Figure 9:
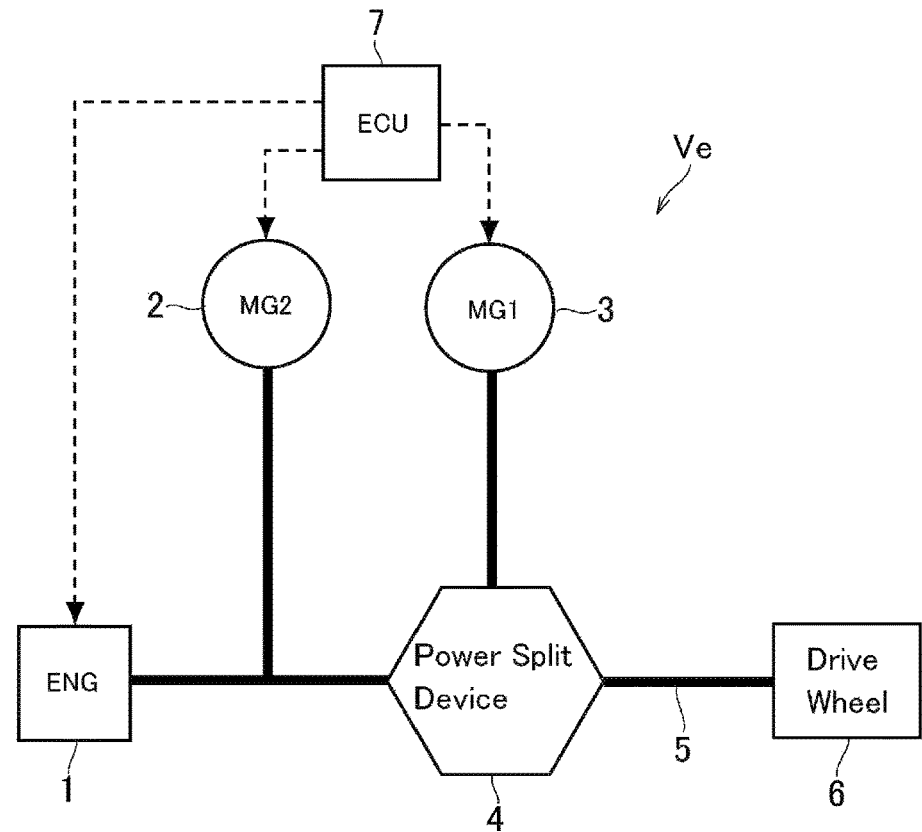
FIG. 9 is a schematic illustration showing a second example of the drive system of the hybrid vehicle.

FIG. 9 shows the second example of the drive system of the vehicle Ve. As the vehicle Ve shown in FIG. 1, the prime mover of the vehicle Ve shown in FIG. 9 also includes the engine, the first motor 2 and the second motor 3, and the vehicle Ve shown in FIG. 9 also comprises the power split device 4, the output member 5, the drive wheels 6, and the controller 7. In the power split device 4 of the vehicle Ve shown in FIG. 1, the input element is connected to the engine 1, the reaction element is connected to the first motor 2, and the output element is connected to the drive wheels 6 through the output member 5. That is, the vehicle Ve shown in FIG. 1 is an input split type hybrid vehicle. By contrast, in the power split device 4 of the vehicle Ve shown in FIG. 9, the input element is connected to the engine 1 and the second motor 3, the reaction element is connected to the first motor 2, and the output element is connected to the output member 5. That is, the vehicle Ve shown in FIG. 9 is an output split type hybrid vehicle.

Figure 10:
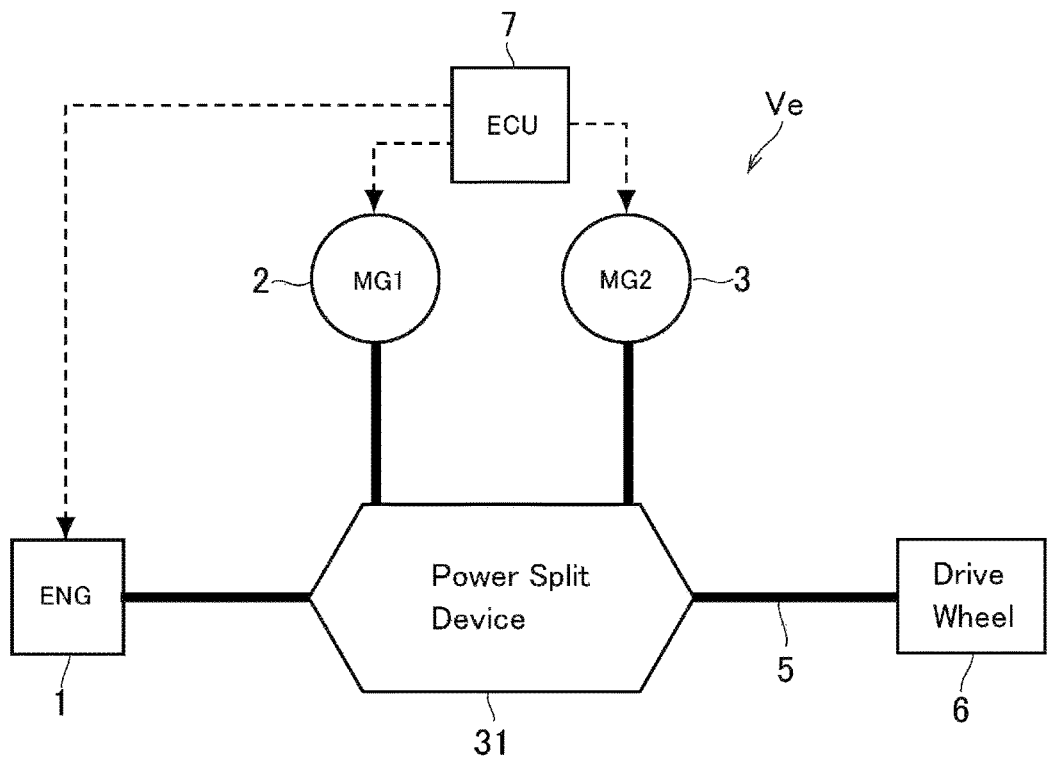
FIG. 10 is a schematic illustration showing a third example of the drive system of the hybrid vehicle.

FIG. 10 shows the third example of the drive system of the vehicle Ve as a complex split type hybrid vehicle. As the vehicle Ve shown in FIG. 1, the prime mover of the vehicle Ve shown in FIG. 10 also includes the engine 1, the first motor 2 and the second motor 3, and the vehicle Ve shown in FIG. 10 comprises a power split device 31, the output member 5, the drive wheels 6, and the controller 7. The power split device 31 is a complex planetary gear unit having four rotary elements that is formed by combining two planetary gear units. In the power split device 31, an input element is connected to the engine 1, an output element is connected to the drive wheels 6 through the output member 5, and remaining rotary elements are individually connected to the first motor 2 and the second motor 3. The power split device 31 is provided with engagement elements such as a clutch for switching a connection among the rotary elements and a brake for selectively stopping a rotation of the rotary element (neither of which are shown). That is, the power split device 31 may also be used as a transmission for changing a speed between the input element and the output element by manipulating the engagement elements.

Figure 11:
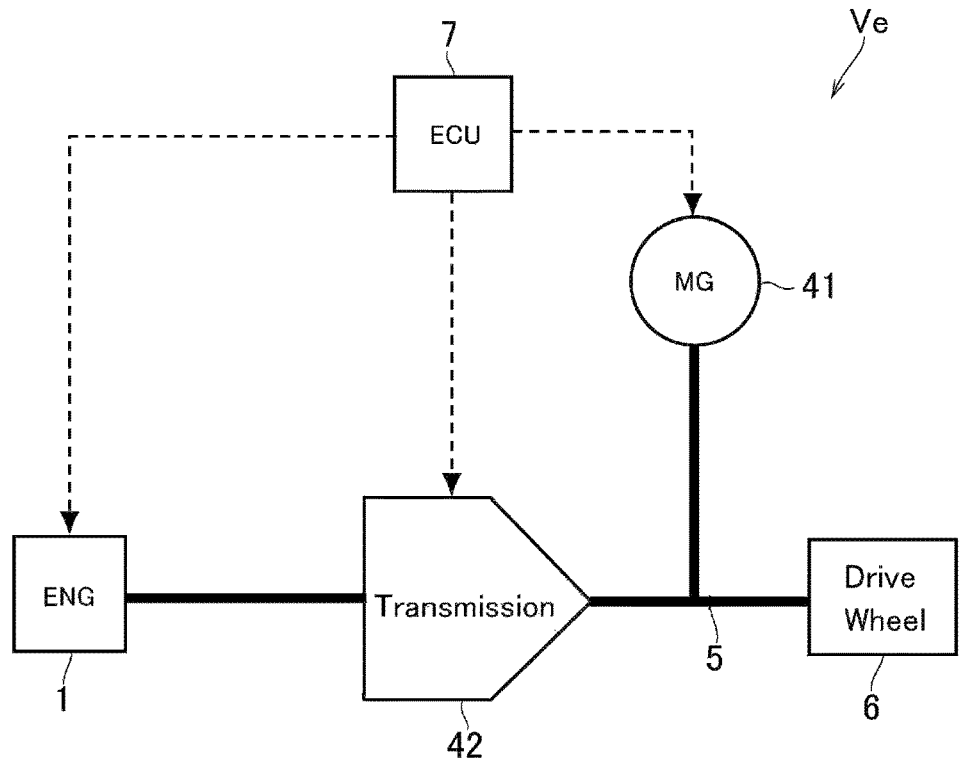
FIG. 11 is a schematic illustration showing a fourth example of the drive system of the hybrid vehicle.
Figure 12:
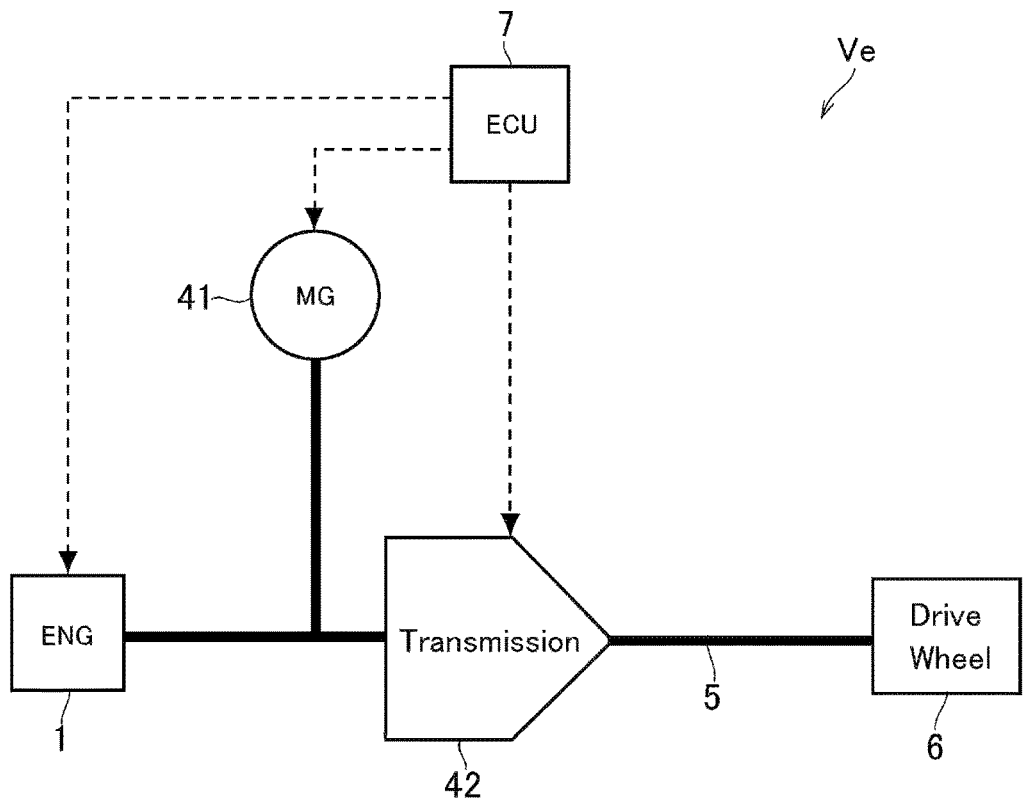
FIG. 12 is a schematic illustration showing a fifth example of the drive system of the hybrid vehicle.
Figure 13:
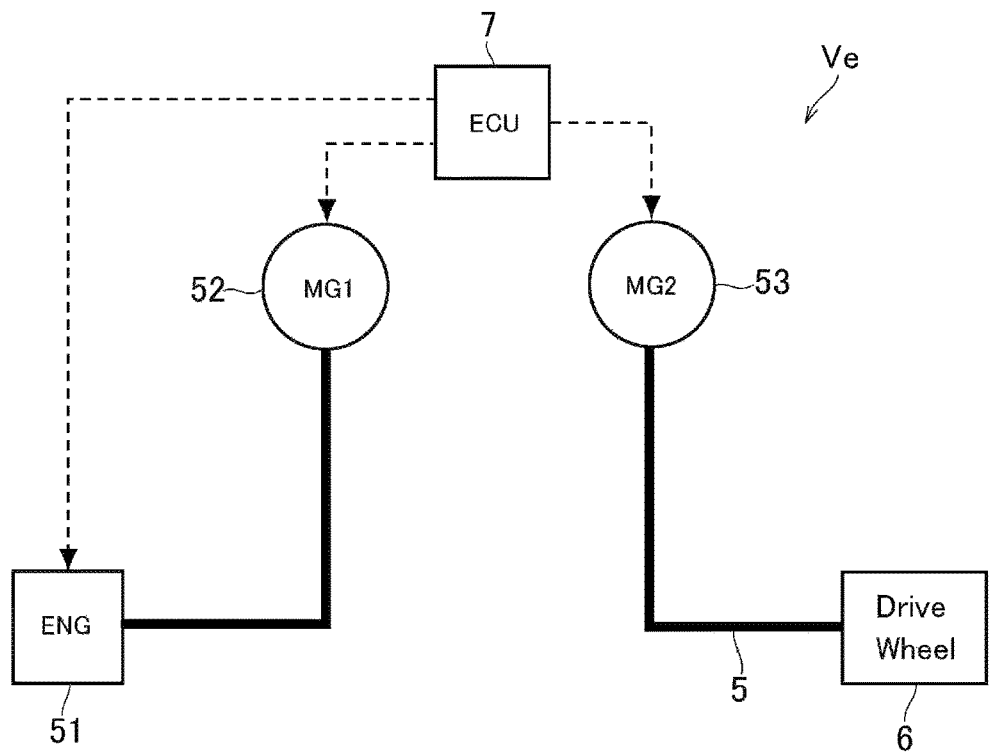
FIG. 13 is a schematic illustration showing a sixth example of the drive system of the hybrid vehicle.

FIGS. 11, 12 and 13 individually show the fourth to sixth examples of the vehicle Ve as a parallel hybrid type hybrid vehicle. In the hybrid vehicles Ve shown in FIGS. 11 to 13, each prime mover individually includes the engine 1 and a motor 41 (referred to as in "MG" FIG. 1), and each of the hybrid vehicles Ve individually comprises a transmission 42, the output member 5, the drive wheels 6 and the controller 7. As the first motor 2 and the second motor 3, a motor-generator may also be used as the motor 41. Specifically, the transmission 42 is an automatic transmission adapted to change a speed ratio thereof continuously. In the hybrid vehicle Ve shown in FIG. 11, the engine 1 is connected to an input side of the transmission 42, and the motor 41 is connected to an output side of the transmission 42 through the output member 5. In the hybrid vehicles Ve shown in FIGS. 12 and 13, the engine 1 and the motor 41 are connected to the input side of the transmission 42, and the drive wheels 6 are connected to the output side of the transmission 42 through the output member 5. In the hybrid vehicle Ve shown in FIG. 13, a clutch 43 is disposed between the engine 1 and the transmission 42.

Figure 14:
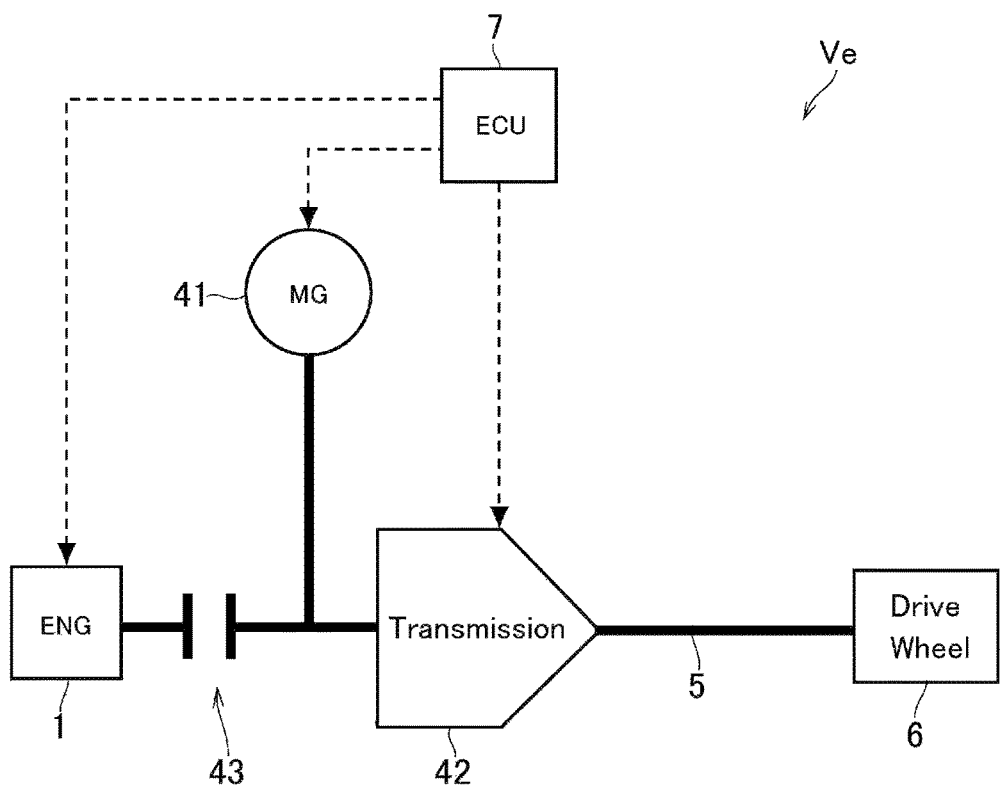
FIG. 14 is a schematic illustration showing a seventh example of the drive system of the hybrid vehicle.

FIG. 14 shows the seventh example of the drive system of the vehicle Ve as a series hybrid type hybrid vehicle. The prime mover of the vehicle Ve shown in FIG. 14 includes an engine (referred to as "ENG" in FIG. 14) 51, a first motor (referred to as "MG1" in FIG. 14) 52 and a second motor (referred to as "MG2" in FIG. 14) 53, and the vehicle Ve shown in FIG. 14 comprises the output member 5, the drive wheels 6, and the controller 7. An internal combustion engine such as a gasoline engine and a diesel engine may also be used as the engine 51, and a motor-generator may also be used as the first motor 52 and the second motor 53. However, a generator may also be used as the first motor 52. In the vehicle Ve shown in FIG. 14, the engine 51 is connected to the first motor 52, and the second motor 53 is connected to the drive wheels 6 through the output member 5. In addition, the first motor 52 and the second motor 53 are electrically connected to each other through a battery, an inverter, or a converter (neither of which are shown) so that thee second motor can be driven by supplying an electricity generated by the first motor 52.

Figure 15:
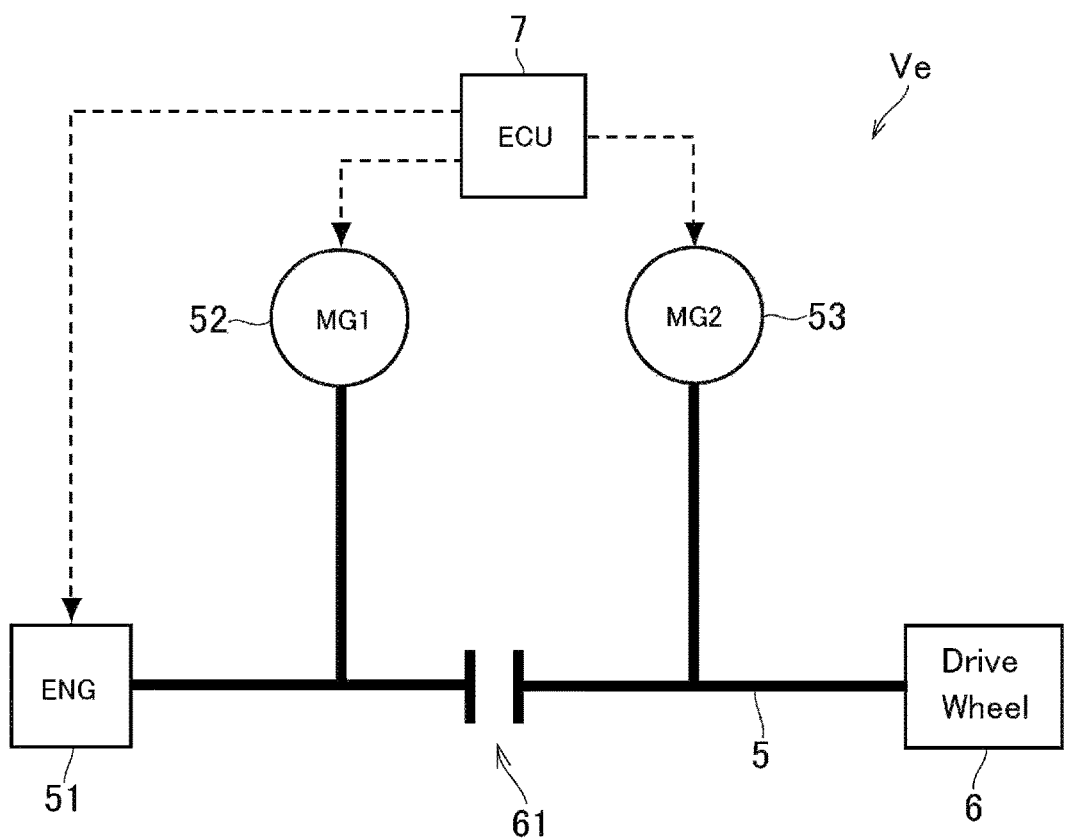
FIG. 15 is a schematic illustration showing an eighth example of the drive system of the hybrid vehicle.

FIG. 15 shows the eighth example of the drive system of the vehicle Ve as a parallel hybrid type hybrid vehicle. As the vehicle Ve shown in FIG. 14, the prime mover of the vehicle Ve shown in FIG. 15 also includes the engine 51, the first motor 52 and the second motor 53, and the vehicle Ve shown in FIG. 15 also comprises the output member 5, the drive wheels 6, and the controller 7. In addition, a clutch 61 is disposed between the engine 51 and the output member 5 to selectively provide a connection therebetween. Specifically, when the clutch 61 is disengaged, the hybrid vehicle Ve serves as the series hybrid type hybrid vehicle. By contrast, when the clutch 61 is engaged, the hybrid vehicle Ve serves as the parallel hybrid type hybrid vehicle.

Although the above exemplary embodiments of the present application have been described, it will be understood by those skilled in the art that the present application should not be limited to the described exemplary embodiments, and various changes and modifications can be made within the spirit and scope of the present application.

What is claimed is:

1. A control system for a hybrid vehicle comprising a prime mover including an engine and a motor, that is configured to operate the hybrid vehicle autonomously, and to select an operating mode of the hybrid vehicle from a hybrid mode in which the hybrid vehicle is powered at least by the engine, and an electric vehicle mode in which the hybrid vehicle is powered by the motor while stopping the engine, comprising:
   a controller that is configured to:
   determine an existence of a passenger in a vehicle compartment;
   select the electric vehicle mode in a case that the hybrid vehicle is operated autonomously while carrying the passenger; and
   select the hybrid mode in a case that the hybrid vehicle is operated autonomously without carrying the passenger,
   wherein the hybrid vehicle is configured to be operated manually by a driver, and
   wherein the controller is further configured to:
   set a lower limit threshold value of a state of charge level of a battery connected to the motor;
   select the hybrid mode in a case that the state of charge level of the battery falls below the lower limit threshold value;
   set the lower limit threshold value to a first lower limit threshold value in a case that the hybrid vehicle is operated manually; and
   set the lower limit threshold value to a second lower limit threshold value that is lower than the first lower limit threshold value in the case that the hybrid vehicle is operated autonomously while carrying the passenger.

2. A control system for a hybrid vehicle comprising a prime mover including an engine and a motor, that is configured to operate the hybrid vehicle autonomously, and to select an operating mode of the hybrid vehicle from a hybrid mode in which the hybrid vehicle is powered at least by the engine, and an electric vehicle mode in which the hybrid vehicle is powered by the motor while stopping the engine, comprising:

a controller that is configured to:
determine an existence of a passenger in a vehicle compartment;
select the electric vehicle mode in a case that the hybrid vehicle is operated autonomously while carrying the passenger; and
select the hybrid mode in a case that the hybrid vehicle is operated autonomously without carrying the passenger,
wherein the hybrid vehicle is configured to be operated manually by a driver, and
wherein the controller is further configured to:
control a state of charge level of a battery connected to the motor based on a target value;
set the target value of a state of charge level of the battery to a first target value in a case that the hybrid vehicle is operated manually; and
set the target value of a state of charge level of the battery to a second target value that is higher than the first target value in the case that the hybrid vehicle is operated autonomously without carrying the passenger.

3. A control system for a hybrid vehicle comprising a prime mover including an engine and a motor, that is configured to operate the hybrid vehicle autonomously, and to select an operating mode of the hybrid vehicle from a hybrid mode in which the hybrid vehicle is powered at least by the engine, and an electric vehicle mode in which the hybrid vehicle is powered by the motor while stopping the engine, comprising:
a sensor for detecting a speed of the hybrid vehicle, and
a controller that is configured to:
determine an existence of a passenger in a vehicle compartment;
select the electric vehicle mode in a case that the hybrid vehicle is operated autonomously while carrying the passenger;
select the hybrid mode in a case that the hybrid vehicle is operated autonomously without carrying the passenger, and
select the hybrid mode in a case that the hybrid vehicle is operated autonomously while carrying the passenger, and that the speed of the hybrid vehicle is higher than a predetermined threshold value.

4. A control system for a hybrid vehicle comprising a prime mover including an engine and a motor, that is configured to operate the hybrid vehicle autonomously, and to select an operating mode of the hybrid vehicle from a hybrid mode in which the hybrid vehicle is powered at least by the engine, and an electric vehicle mode in which the hybrid vehicle is powered by the motor while stopping the engine, comprising:
a sensor for detecting a noise level in the vehicle compartment, and
a controller that is configured to:
determine an existence of a passenger in a vehicle compartment;
select the electric vehicle mode in a case that the hybrid vehicle is operated autonomously while carrying the passenger;
select the hybrid mode in a case that the hybrid vehicle is operated autonomously without carrying the passenger, and
select the hybrid mode in a case that the hybrid vehicle is operated autonomously while carrying the passenger, and that the noise level in the vehicle compartment is higher than a predetermined level.

5. A control system for a hybrid vehicle comprising a prime mover including an engine and a motor, that is configured to operate the hybrid vehicle autonomously, and to select an operating mode of the hybrid vehicle from a hybrid mode in which the hybrid vehicle is powered at least by the engine, and an electric vehicle mode in which the hybrid vehicle is powered by the motor while stopping the engine, comprising:
a controller that is configured to:
determine an existence of a passenger in a vehicle compartment;
select the electric vehicle mode in a case that the hybrid vehicle is operated autonomously while carrying the passenger;
select the hybrid mode in a case that the hybrid vehicle is operated autonomously without carrying the passenger, and
shift the operating mode of the hybrid vehicle to the hybrid mode after travelling a predetermined distance, in a case that all of the passengers have left the hybrid vehicle propelled in the electric vehicle mode.

6. A control system for a hybrid vehicle comprising a prime mover including an engine and a motor, that is configured to operate the hybrid vehicle autonomously, and to select an operating mode of the hybrid vehicle from a hybrid mode in which the hybrid vehicle is powered at least by the engine, and an electric vehicle mode in which the hybrid vehicle is powered by the motor while stopping the engine, comprising:
a controller that is configured to:
determine an existence of a passenger in a vehicle compartment;
select the electric vehicle mode in a case that the hybrid vehicle is operated autonomously while carrying the passenger;
select the hybrid mode in a case that the hybrid vehicle is operated autonomously without carrying the passenger, and
shift the operating mode of the hybrid vehicle to the hybrid mode after elapse of a predetermined period of time, in a case that all of the passengers have left the hybrid vehicle propelled in the electric vehicle mode.

7. A control system for a hybrid vehicle comprising a prime mover including an engine and a motor, that is configured to operate the hybrid vehicle autonomously, and to select an operating mode of the hybrid vehicle from a hybrid mode in which the hybrid vehicle is powered at least by the engine, and an electric vehicle mode in which the hybrid vehicle is powered by the motor while stopping the engine, comprising:
a sensor for detecting a person around the hybrid vehicle, and
a controller that is configured to:
determine an existence of a passenger in a vehicle compartment;
select the electric vehicle mode in a case that the hybrid vehicle is operated autonomously while carrying the passenger;
select the hybrid mode in a case that the hybrid vehicle is operated autonomously without carrying the passenger, and
shift the operating mode of the hybrid vehicle to the hybrid mode in a case that all of the passengers have left the hybrid vehicle propelled in the electric vehicle mode and that no one is detected around the vehicle by the sensor.

* * * * *